US007974105B2

(12) United States Patent
Dean, Jr. et al.

(10) Patent No.: US 7,974,105 B2
(45) Date of Patent: Jul. 5, 2011

(54) APPARATUS AND METHOD FOR ORGANIZING CABLES IN A CABINET

(75) Inventors: David Lee Dean, Jr., Hickory, NC (US); David Brian Donowho, Austin, TX (US); Richard Evans Lewis, II, Austin, TX (US); Karl Theodore Messmer, Keller, TX (US); Alan William Ugolini, Hickory, NC (US)

(73) Assignee: Chatsworth Products, Inc., Westlake Village, CA (US)

( * ) Notice: Subject to any disclaimer, the term of this patent is extended or adjusted under 35 U.S.C. 154(b) by 312 days.

(21) Appl. No.: 12/350,027

(22) Filed: Jan. 7, 2009

(65) Prior Publication Data

US 2009/0273915 A1     Nov. 5, 2009

Related U.S. Application Data

(60) Provisional application No. 61/019,596, filed on Jan. 7, 2008, provisional application No. 61/019,592, filed on Jan. 7, 2008, provisional application No. 61/010,807, filed on Jan. 11, 2008, provisional application No. 61/020,741, filed on Jan. 13, 2008.

(51) Int. Cl.
*H02B 1/01*     (2006.01)

(52) U.S. Cl. ........................................ 361/826

(58) Field of Classification Search ............... 361/825, 361/826; 174/72 R; 385/135; 248/65, 103, 248/126
See application file for complete search history.

(56) References Cited

U.S. PATENT DOCUMENTS

| | | | |
|---|---|---|---|
| 2,531,110 A | 11/1950 | Cisler | 174/52 |
| 2,921,607 A | 1/1960 | Caveney | 138/75 |
| 3,042,351 A | 7/1962 | Du Bois | 248/49 |
| 3,403,220 A | 9/1968 | Riedel et al. | 174/101 |
| 3,485,937 A | 12/1969 | Caveney | 174/101 |
| 3,657,608 A | 4/1972 | Leone et al. | 317/118 |
| 3,705,949 A | 12/1972 | Weiss | 174/101 |

(Continued)

FOREIGN PATENT DOCUMENTS

AU     322229     11/2008

(Continued)

OTHER PUBLICATIONS

Patent Cooperation Treaty, Annex to Invitation to Pay Additional Fees for International Application No. PCT/US2009/000075, May 15, 2009, 2 pages.
Information Disclosure Statement (IDS) Letter Regarding Common Patent Application(s), dated Dec. 14, 2010.
"International Search Report" and "Written Opinion of the International Search Authority" (European Patent Office) in Corning Cable Systems LLC, International Patent Application Serial No. PCT/US2009/000075, dated Aug. 7, 2009, 21 pages.

(Continued)

*Primary Examiner* — Xiaoliang Chen
*Assistant Examiner* — Nathan Milakovich
(74) *Attorney, Agent, or Firm* — Tillman Wright, PLLC; James D. Wright; Chad D. Tillman

(57) ABSTRACT

An equipment cabinet (2) includes an equipment rack (3) for mounting equipment (20), and includes organizational elements for organizing cables within the cabinet. The cables may be organized to reduce impeding airflow to or from the equipment, and/or to reduce unwanted bending of the cables themselves. The organizational elements may include one or more of: a trunk cable (40) including a furcation plug (45) and universal clip (47); a furcation bracket—either vertical (60) or horizontal (80); a termination panel (100); a trunk cable manager (140, 200); and/or an accessory bracket (180). The organizational elements may be used in various combinations with one another, and may be provided in a kit.

14 Claims, 17 Drawing Sheets

U.S. PATENT DOCUMENTS

| | | | | |
|---|---|---|---|---|
| 3,761,603 | A | 9/1973 | Hays et al. | 174/101 |
| 3,890,459 | A | 6/1975 | Caveney | 174/101 |
| 3,968,322 | A | 7/1976 | Taylor | 174/72 A |
| 4,002,856 | A | 1/1977 | Sedlacek et al. | 179/98 |
| 4,136,257 | A | 1/1979 | Taylor | 174/68 C |
| 4,398,564 | A | 8/1983 | Young et al. | 138/92 |
| 4,467,584 | A | 8/1984 | Crites et al. | 52/727 |
| 4,470,102 | A | 9/1984 | De Luca et al. | 361/428 |
| 4,484,020 | A | 11/1984 | Lööf et al. | 174/68 C |
| 4,541,219 | A | 9/1985 | Parker | 52/713 |
| 4,553,674 | A | 11/1985 | Yoshikawa et al. | 211/26 |
| 4,641,225 | A | 2/1987 | Reichle | 361/429 |
| 5,141,185 | A | 8/1992 | Rumbold et al. | |
| 5,165,770 | A | 11/1992 | Hahn | 312/265.4 |
| 5,240,209 | A | 8/1993 | Kutsch | |
| 5,250,752 | A | 10/1993 | Cutright | 174/35 R |
| 5,294,748 | A | 3/1994 | Schwenk et al. | 174/35 R |
| 5,326,934 | A | 7/1994 | LeMaster et al. | 174/59 |
| 5,370,553 | A | 12/1994 | Zimmerman | 439/534 |
| D360,189 | S | 7/1995 | Orlando | D13/154 |
| 5,497,444 | A * | 3/1996 | Wheeler | 385/135 |
| 5,586,012 | A | 12/1996 | Lerman | 361/826 |
| 5,639,150 | A | 6/1997 | Anderson et al. | 312/265.3 |
| 5,640,482 | A | 6/1997 | Barry et al. | 385/135 |
| 5,671,805 | A | 9/1997 | Ståhl et al. | 165/80.3 |
| 5,695,263 | A | 12/1997 | Simon et al. | 312/265.4 |
| 5,758,002 | A | 5/1998 | Walters | 385/134 |
| 5,765,698 | A | 6/1998 | Bullivant | 211/26 |
| D395,816 | S | 7/1998 | Colodny | D8/356 |
| 5,788,087 | A | 8/1998 | Orlando | 211/26 |
| 5,806,945 | A | 9/1998 | Anderson et al. | 312/265.3 |
| 5,842,313 | A | 12/1998 | Murray et al. | |
| 5,851,143 | A | 12/1998 | Hamid | |
| 5,911,661 | A | 6/1999 | Murray et al. | |
| 5,997,117 | A | 12/1999 | Krietzman | 312/265.4 |
| 6,011,221 | A | 1/2000 | Lecinski et al. | 174/72 A |
| 6,036,290 | A | 3/2000 | Jancsek et al. | 312/265.4 |
| 6,067,233 | A | 5/2000 | English et al. | 361/724 |
| 6,102,214 | A | 8/2000 | Mendoza | 211/26 |
| 6,127,631 | A | 10/2000 | Green et al. | 174/72 A |
| 6,163,454 | A | 12/2000 | Strickler | |
| 6,181,862 | B1 | 1/2001 | Noble et al. | 385/135 |
| 6,185,098 | B1 | 2/2001 | Benavides | 361/695 |
| D439,503 | S | 3/2001 | Paliga et al. | D8/356 |
| D440,210 | S | 4/2001 | Larsen et al. | D13/199 |
| 6,245,998 | B1 | 6/2001 | Curry et al. | 174/72 A |
| 6,250,816 | B1 | 6/2001 | Johnston et al. | |
| D446,710 | S | 8/2001 | Sterling et al. | D8/354 |
| 6,280,243 | B1 | 8/2001 | Liu et al. | |
| D448,737 | S | 10/2001 | Nakamura | D13/155 |
| 6,318,680 | B1 | 11/2001 | Benedict et al. | 248/49 |
| 6,347,714 | B1 | 2/2002 | Fournier et al. | 211/26 |
| 6,365,834 | B1 | 4/2002 | Larsen et al. | 174/100 |
| 6,373,721 | B2 | 4/2002 | Lecinski et al. | 361/826 |
| 6,386,120 | B1 | 5/2002 | Nelson et al. | |
| 6,394,398 | B1 | 5/2002 | Reed et al. | 248/57 |
| 6,398,149 | B1 | 6/2002 | Hines et al. | 242/399 |
| 6,403,885 | B1 | 6/2002 | Baker, III et al. | 174/68.3 |
| D463,253 | S | 9/2002 | Canty | D8/356 |
| 6,461,052 | B1 | 10/2002 | Hines et al. | 385/53 |
| 6,467,633 | B1 | 10/2002 | Mendoza | 211/26 |
| 6,468,112 | B1 | 10/2002 | Follingstad et al. | 439/719 |
| 6,489,565 | B1 | 12/2002 | Krietzman et al. | 174/101 |
| 6,501,899 | B1 * | 12/2002 | Marrs et al. | 385/135 |
| 6,504,987 | B1 | 1/2003 | Macken et al. | 385/135 |
| 6,541,705 | B1 | 4/2003 | McGrath | 174/99 R |
| 6,584,267 | B1 | 6/2003 | Caveney et al. | 385/134 |
| 6,600,106 | B2 | 7/2003 | Standish et al. | 174/68.3 |
| 6,600,107 | B1 | 7/2003 | Wright et al. | 174/72 A |
| 6,601,932 | B1 | 8/2003 | Helgenberg et al. | 312/265.4 |
| 6,605,782 | B1 | 8/2003 | Krietzman et al. | 174/101 |
| 6,614,978 | B1 | 9/2003 | Caveney | 385/135 |
| 6,647,197 | B1 | 11/2003 | Marrs et al. | 385/134 |
| 6,652,373 | B2 | 11/2003 | Sharp et al. | |
| 6,704,196 | B1 | 3/2004 | Rodriguez et al. | 361/687 |
| 6,708,830 | B2 | 3/2004 | Mendoza | 211/26 |
| 6,715,619 | B2 | 4/2004 | Kim et al. | 211/26 |
| 6,738,555 | B1 * | 5/2004 | Cooke et al. | 385/136 |
| 6,760,531 | B1 * | 7/2004 | Solheid et al. | 385/135 |
| 6,796,437 | B2 * | 9/2004 | Krampotich et al. | 211/26 |
| 6,803,524 | B2 * | 10/2004 | Levenson et al. | 174/99 R |
| 6,818,834 | B1 | 11/2004 | Lin | 174/135 |
| 6,845,207 | B2 * | 1/2005 | Schray | 385/135 |
| 6,866,541 | B2 | 3/2005 | Barker et al. | 439/540.1 |
| 6,918,796 | B2 | 7/2005 | Elliot et al. | 439/719 |
| 6,930,886 | B2 | 8/2005 | Velez et al. | 361/727 |
| 6,944,389 | B2 * | 9/2005 | Giraud et al. | 385/135 |
| 6,946,605 | B2 | 9/2005 | Levesque et al. | 174/100 |
| 6,964,588 | B2 | 11/2005 | Follingstad et al. | 439/719 |
| 6,968,647 | B2 | 11/2005 | Levesque et al. | 49/192 |
| 6,981,893 | B2 | 1/2006 | Barker et al. | 439/540.1 |
| 7,000,784 | B2 | 2/2006 | Canty et al. | 211/26 |
| 7,011,576 | B2 | 3/2006 | Sharp et al. | |
| 7,019,213 | B1 | 3/2006 | McNutt et al. | 174/68.1 |
| 7,026,553 | B2 | 4/2006 | Levesque et al. | 174/100 |
| 7,077,688 | B2 * | 7/2006 | Peng | 439/471 |
| 7,083,051 | B2 | 8/2006 | Smith et al. | 211/26 |
| 7,092,258 | B2 * | 8/2006 | Hardt et al. | 361/826 |
| 7,097,047 | B2 | 8/2006 | Lee et al. | 211/26.2 |
| 7,119,282 | B2 | 10/2006 | Krietzman et al. | 174/101 |
| 7,120,348 | B2 | 10/2006 | Trebesch et al. | |
| 7,142,765 | B2 | 11/2006 | Rapp et al. | 385/137 |
| 7,154,748 | B2 | 12/2006 | Yamada | |
| 7,178,679 | B2 | 2/2007 | Canty et al. | 211/26 |
| 7,182,208 | B2 | 2/2007 | Tachibana | |
| D539,228 | S | 3/2007 | Toikka et al. | D13/155 |
| 7,200,316 | B2 * | 4/2007 | Giraud et al. | 385/135 |
| 7,200,931 | B2 | 4/2007 | Clark et al. | 29/868 |
| 7,220,150 | B2 | 5/2007 | Follingstad et al. | 439/719 |
| 7,225,586 | B2 | 6/2007 | Levesque et al. | 49/506 |
| 7,229,050 | B2 | 6/2007 | Schloss | |
| 7,277,614 | B2 * | 10/2007 | Cody et al. | 385/100 |
| 7,285,027 | B2 | 10/2007 | McGrath et al. | 439/719 |
| 7,286,345 | B2 | 10/2007 | Casebolt | |
| 7,300,308 | B2 * | 11/2007 | Laursen et al. | 439/540.1 |
| 7,309,279 | B2 | 12/2007 | Sharp et al. | |
| 7,330,629 | B2 | 2/2008 | Cooke et al. | 385/136 |
| 7,345,241 | B2 | 3/2008 | Caveney et al. | 174/99 R |
| 7,349,209 | B2 | 3/2008 | Campbell et al. | |
| 7,359,612 | B1 | 4/2008 | Bjorklund et al. | 385/135 |
| 7,362,941 | B2 | 4/2008 | Rinderer et al. | 385/134 |
| 7,378,046 | B2 | 5/2008 | Canty et al. | 264/318 |
| 7,381,100 | B2 | 6/2008 | Follingstad et al. | 439/719 |
| 7,406,242 | B1 | 7/2008 | Braga | 385/135 |
| 7,417,188 | B2 | 8/2008 | McNutt et al. | 174/68.1 |
| 7,425,678 | B2 | 9/2008 | Adducci et al. | 174/50 |
| 7,427,713 | B2 | 9/2008 | Adducci et al. | 174/50 |
| 7,437,048 | B2 | 10/2008 | Farrell et al. | 385/135 |
| 7,458,859 | B2 | 12/2008 | McGrath et al. | 439/701 |
| 7,472,970 | B2 | 1/2009 | Bergesch et al. | |
| 7,485,803 | B2 | 2/2009 | Adducci et al. | 174/50 |
| 7,486,512 | B2 | 2/2009 | Campbell et al. | |
| 7,495,169 | B2 | 2/2009 | Adducci et al. | 174/50 |
| 7,504,581 | B2 | 3/2009 | Adducci et al. | 174/50 |
| 7,508,663 | B2 | 3/2009 | Coglitore et al. | |
| D596,928 | S | 7/2009 | Lawrence et al. | |
| D596,929 | S | 7/2009 | Lawrence et al. | |
| D602,764 | S | 10/2009 | Pae et al. | |
| D611,326 | S | 3/2010 | Alaniz et al. | |
| 7,687,716 | B2 | 3/2010 | Pepe et al. | |
| 7,697,285 | B2 | 4/2010 | Donowho et al. | |
| 7,746,637 | B2 | 6/2010 | Donowho et al. | |
| 7,762,405 | B2 | 7/2010 | Vogel et al. | |
| 7,839,635 | B2 | 11/2010 | Donowho et al. | |
| D629,289 | S | 12/2010 | Krietzman et al. | |
| D630,167 | S | 1/2011 | Donowho | |
| D630,173 | S | 1/2011 | Donowho et al. | |
| 2001/0022231 | A1 | 9/2001 | Dyer | 174/48 |
| 2001/0030266 | A1 | 10/2001 | MacDonald et al. | 248/65 |
| 2002/0176681 | A1 * | 11/2002 | Puetz et al. | 385/134 |
| 2002/0197045 | A1 | 12/2002 | Schmidt et al. | 385/134 |
| 2003/0020379 | A1 | 1/2003 | Larsen et al. | 312/218 |
| 2003/0190036 | A1 | 10/2003 | Mandoza | 379/327 |
| 2004/0007372 | A1 | 1/2004 | Krietzman et al. | 174/50 |
| 2004/0011547 | A1 | 1/2004 | Wright | 174/50 |
| 2004/0050808 | A1 * | 3/2004 | Krampotich et al. | 211/26 |
| 2004/0069725 | A1 | 4/2004 | Adducci | 211/26 |

| | | | | | | | |
|---|---|---|---|---|---|---|---|
| 2004/0094491 | A1 | 5/2004 | Smith et al. ............. 211/26 | EC | 000968607-0005 | | 7/2008 |
| 2004/0173545 | A1 | 9/2004 | Canty et al. ............. 211/26 | EC | 000968607-0007 | | 7/2008 |
| 2004/0183409 | A1 | 9/2004 | Rinderer ............. 312/265.4 | EC | 000968607-0008 | | 7/2008 |
| 2004/0190270 | A1 | 9/2004 | Aldag et al. ............. 361/752 | EC | 001173330-0001 | | 10/2009 |
| 2004/0201335 | A1 | 10/2004 | Davis ............. 312/265.3 | EC | 001173330-0002 | | 10/2009 |
| 2005/0006323 | A1 | 1/2005 | Abby et al. ............. 211/26 | EC | 001173330-0003 | | 10/2009 |
| 2005/0029910 | A1 | 2/2005 | Woods ............. 312/223.3 | EP | 0577433 | | 1/1994 |
| 2005/0057912 | A1 | 3/2005 | Hardt et al. ............. 361/826 | EP | 646811 | A2 * | 4/1995 |
| 2005/0103517 | A1 | 5/2005 | Canepa ............. 174/68.3 | IN | 216979 | | 6/2009 |
| 2005/0111810 | A1* | 5/2005 | Giraud et al. ............. 385/135 | IN | 216981 | | 7/2009 |
| 2005/0115152 | A1 | 6/2005 | Levesque et al. ............. 49/192 | IN | 216983 | | 7/2009 |
| 2005/0115737 | A1 | 6/2005 | Levesque et al. ............. 174/100 | IN | 216984 | | 7/2009 |
| 2005/0221683 | A1 | 10/2005 | McGrath et al. ............. 439/701 | IN | 216985 | | 7/2009 |
| 2005/0247650 | A1 | 11/2005 | Vogel et al. ............. 211/26 | IN | 216982 | | 8/2009 |
| 2005/0259383 | A1 | 11/2005 | Ewing et al. ............. 361/622 | IN | 216980 | | 3/2010 |
| 2006/0054336 | A1 | 3/2006 | McNutt et al. | IN | 225382 | | 9/2010 |
| 2006/0059802 | A1 | 3/2006 | McNutt et al. ............. 52/220.7 | MX | 27994 | | 4/2009 |
| 2006/0091086 | A1 | 5/2006 | Canty et al. ............. 211/26 | MX | 27995 | | 4/2009 |
| 2006/0103270 | A1* | 5/2006 | Bergesch et al. ............. 312/223.1 | MX | 27996 | | 4/2009 |
| 2006/0162948 | A1* | 7/2006 | Rinderer et al. ............. 174/50 | MX | 27997 | | 4/2009 |
| 2006/0171651 | A1 | 8/2006 | Laursen | MX | 29091 | | 8/2009 |
| 2006/0243680 | A1 | 11/2006 | Levesque et al. ............. 211/26 | MX | 29092 | | 8/2009 |
| 2006/0263029 | A1* | 11/2006 | Mudd et al. ............. 385/135 | SG | D2009/924 | H | 10/2009 |
| 2007/0047897 | A1* | 3/2007 | Cooke et al. ............. 385/136 | SG | D2009/925/D | | 10/2009 |
| 2007/0207666 | A1 | 9/2007 | Caveney et al. ............. 439/540.1 | SG | D2009/926/J | | 10/2009 |
| 2007/0210679 | A1 | 9/2007 | Adducci et al. ............. 312/7.2 | WO | WO 99/48305 | | 9/1999 |
| 2007/0210680 | A1 | 9/2007 | Appino et al. ............. 312/7.2 | WO | WO 01/01534 | | 1/2001 |
| 2007/0210681 | A1 | 9/2007 | Adducci et al. ............. 312/7.2 | WO | WO 02/052866 | | 7/2002 |
| 2007/0210683 | A1 | 9/2007 | Adducci et al. ............. 312/223.1 | WO | 2006055506 | A2 | 5/2006 |
| 2007/0210686 | A1 | 9/2007 | Adducci et al. ............. 312/265.2 | WO | WO 2008/144678 | A1 | 11/2008 |
| 2007/0212010 | A1 | 9/2007 | Caveney ............. 385/135 | WO | 2009089008 | A2 | 7/2009 |
| 2007/0221393 | A1 | 9/2007 | Adducci et al. ............. 174/50 | WO | 2009089306 | A1 | 7/2009 |
| 2007/0249237 | A1 | 10/2007 | Follingstad et al. ............. 439/722 | WO | 2009089307 | A2 | 7/2009 |
| 2008/0035810 | A1 | 2/2008 | Lewis, II ............. 248/200 | WO | 2009143193 | A2 | 11/2009 |
| 2008/0037228 | A1 | 2/2008 | Lewis, II ............. 361/724 | WO | 2009089307 | A3 | 12/2009 |
| 2008/0062654 | A1 | 3/2008 | Mattlin et al. | WO | 2010028384 | A2 | 3/2010 |
| 2008/0062655 | A1 | 3/2008 | Laursen et al. ............. 361/733 | | | | |
| 2008/0174217 | A1 | 7/2008 | Walker ............. 312/329 | | | | |
| 2008/0316702 | A1 | 12/2008 | Donowho et al. ............. 361/695 | | | | |
| 2008/0316703 | A1 | 12/2008 | Donowho et al. ............. 361/695 | | | | |
| 2009/0038845 | A1 | 2/2009 | Fransen et al. ............. 174/72 R | | | | |
| 2009/0061755 | A1 | 3/2009 | Calder et al. | | | | |
| 2009/0093169 | A1 | 4/2009 | McGrath et al. ............. 439/719 | | | | |
| 2009/0129013 | A1 | 5/2009 | Donowho et al. ............. 361/690 | | | | |
| 2009/0190307 | A1 | 7/2009 | Krietzman | | | | |
| 2009/0224110 | A1 | 9/2009 | Donowho et al. | | | | |
| 2009/0236117 | A1 | 9/2009 | Garza et al. | | | | |
| 2009/0239461 | A1 | 9/2009 | Lewis et al. | | | | |
| 2009/0283488 | A1 | 11/2009 | McMillan et al. | | | | |
| 2010/0061059 | A1 | 3/2010 | Krietzman et al. | | | | |
| 2010/0193754 | A1 | 8/2010 | Garza et al. | | | | |
| 2010/0200707 | A1 | 8/2010 | Garza et al. | | | | |
| 2011/0019362 | A1 | 1/2011 | Krietzman | | | | |

FOREIGN PATENT DOCUMENTS

| | | |
|---|---|---|
| AU | 322230 | 11/2008 |
| AU | 322231 | 11/2008 |
| AU | 322232 | 11/2008 |
| AU | 322233 | 11/2008 |
| AU | 323811 | 1/2009 |
| AU | 323812 | 1/2009 |
| AU | 323813 | 1/2009 |
| AU | 323814 | 1/2009 |
| AU | 328418 | 10/2009 |
| AU | 328419 | 10/2009 |
| AU | 328420 | 10/2009 |
| AU | 332167 | 8/2010 |
| AU | 332168 | 8/2010 |
| CA | 132619 | 6/2010 |
| CN | ZL200830139486.2 | 10/2009 |
| CN | ZL200830139492.8 | 10/2009 |
| CN | ZL200830139487.7 | 11/2009 |
| CN | ZL200830139489.6 | 11/2009 |
| CN | ZL200830139490.9 | 11/2009 |
| CN | ZL200830139491.3 | 11/2009 |
| CN | ZL200830139488.1 | 2/2010 |
| EC | 000968607-0002 | 7/2008 |
| EC | 000968607-0003 | 7/2008 |
| EC | 000968607-0004 | 7/2008 |

OTHER PUBLICATIONS

"International Search Report" and "Written Opinion" of the International Searching Authority (Korean Intellectual Property Office) in Chatsworth Products, Inc. et al., International Patent Application Serial No. PCT/US2009030369, filed on Jan. 7, 2009 mailed on Oct. 12, 2009 and completed on Oct. 9, 2009, 9 pages.

"International Search Report" and "Written Opinion" of the International Searching Authority (Korean Intellectual Property Office) in Chatsworth Products, Inc. et al., International Patent Application Serial No. PCT/US2009044577, dated Jan. 12, 2010, 7 pages.

"International Search Report" and "Written Opinion" of the International Searching Authority (ISA/US Korean Intellectual Property Office) in Chatsworth Products, Inc. et al., International Patent Application Serial No. PCT/US2009/056256, International Filing Date Sep. 8, 2009, Mailed on Apr. 7, 2010, and completed on Apr. 6, 2010, 7 pages.

Information Disclosure Statement (IDS) Letter Regarding Common Patent Application(s), dated Sep. 2, 2010.

Office for Harmonization in the Internal Market, Trade Marks and Designs, RCD-Online—Design Consultation Service, http://oami.europ.eu/RCDOnline/RequestManager, EC 000968607-0001, Daniel Alaniz, Jul. 7, 2008, 3 pages.

Office for Harmonization in the Internal Market, Trade Marks and Designs, RCD-Online—Design Consultation Service, http://oami.europ.eu/RCDOnline/RequestManager, EC 000968607-0006, James I. Lawrence, Jul. 7, 2008, 3 pages.

Office for Harmonization in the Internal Market, Trade Marks and Designs, RCD-Online—Design Consultation Service, http://oami.europ.eu/RCDOnline/RequestManager, EC 000968607-0009, James I. Lawrence, Jul. 7, 2008, 3 pages.

Office for Harmonization in the Internal Market, Trade Marks and Designs, RCD-Online—Design Consultation Service, http://oami.europ.eu/RCDOnline/RequestManager, EC 000968607-0010, James I. Lawrence, Jul. 7, 2008, 3 pages.

Office for Harmonization in the Internal Market, Trade Marks and Designs, RCD-Online—Design Consultation Service, http://oami.europ.eu/RCDOnline/RequestManager, EC 000968607-0011, James I. Lawrence, Jul. 7, 2008, 3 pages.

* cited by examiner

APPARATUS AND METHOD FOR ORGANIZING CABLES IN A CABINET

CROSS-REFERENCE TO RELATED APPLICATIONS

The present application is a U.S. nonprovisional patent application of, and claims priority under 35 U.S.C. §119(e) to, each of:
(1) U.S. provisional patent application Ser. No. 61/019,596, filed Jan. 7, 2008;
(2) U.S. provisional patent application Ser. No. 61/019,592, filed Jan. 7, 2008;
(3) U.S. provisional patent application Se. No. 61/010,807, filed Jan. 11, 2008; and
(4) U.S. provisional patent application Ser. No. 61/020,741, filed Jan. 13, 2008.
Each of the foregoing provisional patent applications is incorporated by reference herein.

COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present invention relates to equipment cabinets that mount telecommunication equipment and, more particularly, to systems and organizational elements for supporting cables and similar structures in an electronic equipment cabinet.

TECHNICAL BACKGROUND

Frames and cabinets for mounting and storing electronic components have been well known for many years. Frames are typically simple rectangular frameworks on which electronic components may be mounted, or on which other mounting members, such as shelves or brackets, may be mounted which in turn may support the electronic components. Cabinets are typically frames on which panels or doors, or both, are hung to provide aesthetic improvement, to protect the components from external influences, to provide security for the components stored inside, or for other reasons.

Frames and cabinets (sometimes collectively referred to hereinafter as "enclosures") have been built in many different sizes and with many different proportions in order to best accommodate the components which they are designed to store. Components stored in these enclosures may include audio and video equipment and the like, but quite frequently include computer equipment and related peripheral devices. Regardless of the component type, each component typically requires an external power supply and a plurality of input and output cables, wires and the like (generally referred to hereinafter as "cables"). Some of these wires and cables are connected to other components in the same enclosure, and some of which extend out of the enclosure to either an adjacent enclosure or to a remote location, typically using either an overhead cabling system or an under-floor cabling system.

Apparatuses for routing cables and wires to and from the equipment are also well known. These cables are generally routed in the vertical direction to a point adjacent to the desired equipment and then routed in the horizontal direction to the desired equipment. A particular problem inherent in the use of enclosures of all kinds is the issue of how to route and otherwise manage the large quantities of cables that are often necessary for a particular enclosure.

A type of cable often used in computer network settings is optical fiber. Optical fibers sometimes have unique problems associated with routing and managing the large quantity thereof in enclosures.

A brief general summary of optical fibers may be helpful in understanding the disclosure contained herein. Regarding optical fibers, a single cable may house a single optical fiber or a single cable may house multiple optical fibers. A cable housing many optical fibers may be referred to as a trunk cable. A trunk cable may be used to interconnect different system equipment. A furcation plug is often used to furcate or spread apart the individual optical fibers in a cable housing multiple optical fibers. The individual optical fibers may then be terminated with a connector to allow for connection to equipment and/or other optical fibers.

Optical fibers are often used in computer network settings because of their ability to quickly transmit data. An optical fiber is a glass or plastic fiber designed to guide light along its length. Because of the way in which optical fiber transmits data, joining lengths of optical fiber is more complex than joining electrical wire or cable. More particularly, the ends of the fibers need to be carefully cleaved, and then spliced together either mechanically or by fusing them together with an electric arc in order for light to continue to travel along the length of the optical fiber Special optical fiber connectors are used to enable removable connections between multiple optical fibers.

An optical fiber connector terminates the end of an optical fiber and enables quick connection and disconnection of the optical fiber. The connector mechanically couples and aligns the core of the fiber so that light can pass therethrough. Many types of optical fiber connectors are available. Connectors may be single fiber connectors or multiple fiber connectors.

By using multiple fiber connectors, the number of fibers carried by each cable may be increased thereby reducing the total number of cables being routed through a cabinet. For example, by using a 12-fiber MTP connector, the number of fiber cables may be reduced from six LC duplex fiber cables to one 12-fiber MTP cable assembly, i.e., 6 cables carrying two fibers each may be reduced to 1 cable carrying 12 fibers by using an MTP connector.

Unfortunately, one of the fundamental challenges for high density storage area networks is the large volume of optical fiber cable and patch cords that must be managed in cabinets which house large, modular (core) switches, or other equipment. Typically, an enclosure will house two core switches. If each of the switches is fully populated with optical fibers, there may be hundreds or thousands of optical fibers attached to the two switches. It is readily apparent that such fiber volume concentrated along the sides of the cabinets can quickly become congested and disorganized causing problems with enclosure thermal management, blocking airflow, increasing risk of unwanted bending of the cables, and making it difficult to administer networking moves, adds and changes. Further, this congestion reduces accessibility to the equipment, creates a mass of cable that is difficult to work with, and increases the cost of implementing routine changes to the network.

Current solutions to the fiber congestion problem involve fiber connectors, such as the MTP connector mentioned above, that reduce the number of fiber cables present in the enclosure. However, fiber connectors are typically housed in the rack-mount space of the enclosure and utilize either fiber housings or fiber panels to accommodate the fiber connectors. This solution consumes valuable rack-mount space within the enclosure that could be used to house electronic equipment. Further, housing fiber connectors in the rack-mount space increases optical fiber congestion by requiring the optical fibers to enter back into the rack-mount space after the have exited such space when leaving the core switches, i.e., typically optical fiber is routed away from a core switch in the rack-mount space into side panel space of an enclosure and then routed back to a fiber connector in the rack-mount space. For a fully populated core switch, this is approximately 1000 optical fibers being routed away from the core switch in the rack-mount space into the side panel space of an enclosure and then routed back into the rack-mount space to join with a fiber connector.

In other instances, fiber connectors have been placed in the enclosure side panel space. However, currently available connectors that may be mounted in the side space are restricted to fixed locations and low capacities by the limitations of the fixed brackets that are currently available. Available fiber connectors that are mounted in cabinet side space rely on purpose-built brackets with little or no flexibility in location, capacity, or functionality. These brackets typically allow for mounting existing fiber connectors in fixed locations with little or no support for fiber trunk cabling.

A solution is needed that improves optical fiber organization and reduces fiber congestion. Ideally, such solution will be simple, yet versatile, so that it may be used in a variety of enclosures and in multiple network or server settings. It would also be beneficial for such solution to provide improved fiber trunk cable routing.

SUMMARY

An equipment cabinet includes a rack having a central rack space for mounting equipment, for example telecommunications equipment, wherein the equipment is connected to a network by cables. The equipment cabinet further includes organizational elements for mounting the cables so as to organize the cables within the cabinet, outside the central rack space. The cables may be organized to reduce impeding airflow to or from the equipment in the cabinet, and/or to reduce unwanted bending of the cables themselves, as the unwanted bending of the cables may cause network degradation or even failure. Further, the organization of the cables facilitates installation, moves, adds, and changes, of the cables and equipment within the cabinet. The organizational elements for mounting the cables may include one or more of: a trunk cable including a furcation plug and universal clip; a furcation bracket (either vertical or horizontal); a termination panel; a trunk cable manager; and/or an accessory bracket. The organizational elements may be used in various combinations with one another, depending upon the needs within the equipment cabinet, and may be provided in a kit. By providing the organizational elements in a kit, the user is guaranteed that the organizational elements will assemble and work together without attempting to cross-reference component specification sheets or have to field trial compatibility, which takes considerable time and money.

According to one aspect, there is provided a method of routing a cable in an equipment cabinet to reduce impeding airflow to or from equipment mounted in a central rack space of an equipment rack in the equipment cabinet. The equipment includes a wall with an airflow opening therein, and the method includes supporting the cable at a first point adjacent to the wall and on a first side of the airflow opening, supporting the cable at a second point adjacent to the wall and on a second side of the airflow opening, wherein the first and second points are disposed outside of the central rack space. And routing the cable from the first point to the second point so as not to cross the airflow opening.

The cable may include a furcation plug and a furcation leg extending from the furcation plug. The furcation plug is coupled to a furcation bracket at the first point and the furcation bracket is coupled to the equipment rack, and further wherein the furcation leg is coupled to a termination panel at the second point and the termination panel is coupled to the equipment rack. As an alternative to the termination panel, or in addition thereto, an accessory bracket coupled to the rack may be used to provide the second point of support for the furcation cable.

The termination panel may further include an attachment portion disposed in a first plane and coupled to the equipment rack, a socket mounting portion having a socket, and a coupling portion. The coupling portion couples the socket mounting portion to the attachment portion so that the socket mounting portion is offset from the first plane. The furcation leg is then coupled to the socket.

According another aspect, there is provided an equipment cabinet having its cables organized to facilitate moves, adds, or changes, as well as to avoid unwanted bending of the cables.

The equipment cabinet includes an equipment rack having a central rack space. A furcation bracket is coupled to the equipment rack. A trunk cable having a furcation plug is coupled to the furcation bracket so that the furcation plug is outside the central rack space. A trunk cable manager is coupled to the equipment rack outside the central rack space and includes a first planar portion. The first planar portion supports the trunk cable at a point adjacent to the furcation plug.

The trunk cable manager may further include a second planar portion coupled to the first planar portion by an angled portion, wherein the first planar portion supports the trunk cable at a first distance from the furcation bracket, the second planar portion supports the trunk cable at a second distance from the furcation bracket, and wherein the second distance is greater than the first distance.

The second planar portion of the trunk cable manager may further include either a trough portion, or slots for supporting the trunk cable at an additional point.

The furcation plug may be coupled to the furcation bracket by a universal clip. The universal clip includes a first locking member, and a second locking member. The spacing between the locking member is matched to that between pairs of slots in the furcation bracket so as to provide flexibility in mounting the furcation plug in the cabinet.

The termination panel may include an attachment portion, a socket mounting portion, and a coupling portion. The attachment portion is disposed in a first plane and is coupled to the equipment rack so that the termination panel is disposed outside the central rack space. The socket mounting portion includes a socket, and the coupling portion couples the socket mounting portion to the attachment portion so that the socket mounting portion is offset from the first plane. Further, the furcation leg is coupled to the socket.

The termination panel may have only a specified number of sockets, wherein the specified number corresponds to a specified number of connectors in one piece of equipment.

According to yet another aspect, there is provided a kit of components, for organizing cables in an equipment cabinet including an equipment rack having a central rack space. The kit includes a trunk cable, a furcation bracket, a termination panel, and a trunk cable manager. The trunk cable includes a furcation plug having locking members spaced from one another by a first length, furcation legs extending from the furcation plug, and connectors coupled to the furcation legs. The furcation bracket includes either a row or a column of pairs of slots, wherein the slots in each of the pairs of slots are spaced from one another by a second length, and the second length is substantially equal to the first length for receiving the locking members of the furcation plug. The termination panel includes an opening for receiving sockets sized to receive the connectors on the furcation legs. The termination panel is sized to be disposed in the equipment cabinet outside the central rack space. The trunk cable manager includes a first planar portion for supporting the trunk cable at a first point, and a second planar portion for supporting the trunk cable at a second point, wherein the first and second planar portions are connected by an angled portion whereby the first and second planar portions are not coplanar.

The trunk cable manager may include a plurality of slots disposed in the first planar portion and sized to receive fastening members for holding the trunk cable.

The trunk cable manager further may include a plurality of slots disposed in the second planar portion and sized to receive fastening members for holding the trunk cable. Alternatively, the second planar portion may further include a trough for supporting the trunk cable.

The kit of components may further include an accessory bracket having pairs of mounting holes therein. The mounting holes in each pair are spaced from one another by a first distance. The termination panel may then also include mounting holes, wherein the mounting holes in the termination panel are spaced from one another by a second distance, which is substantially equal to the first distance.

The accessory bracket may further include a plurality of slots sized to receive fastening members for holding the trunk cable.

The present invention according to another aspect is an equipment cabinet including an equipment rack including a central rack space; a cable manager, having a first planar portion, coupled to the equipment rack outside the central rack space; a furcation bracket, having a second planar portion, coupled to the equipment rack such that the second planar portion is parallel with the first planar portion; and a cable having a first segment, a second segment and a third segment, the first segment of the cable being routed vertically along the cable manager, the second segment of the cable being supported by the first planar portion of the cable manager, and the third segment of the cable being routed horizontally and supported by the second planar portion of the furcation bracket.

In a feature of this aspect, the cable manager extends substantially the height of the equipment rack.

In a further feature of this aspect, the furcation bracket is a vertical furcation bracket.

In a further feature of this aspect, the vertical furcation bracket extends substantially the height of the equipment rack.

In a further feature of this aspect, the vertical furcation bracket extends substantially the height of the cable manager.

In a further feature of this aspect, the cable manager defines a trough for retaining the first segment of the cable therein.

In a further feature of this aspect, the trunk has a J-shaped cross-section.

The present invention according to another aspect is an equipment cabinet including an equipment rack having a central rack space; a cable manager, having a first planar portion, coupled to the equipment rack outside the central rack space; a vertical furcation bracket, having a second planar portion, coupled to the equipment rack such that the second planar portion is parallel with the first planar portion; a horizontal furcation bracket, having a third planar portion, coupled to the equipment rack such that the third planar portion is parallel with the first and second planar portions; and a cable having a first segment and a second segment, the first segment of the cable being routed vertically along the cable manager, and the second segment of the cable being supported by at least one of the second and third planar portions.

In features of this aspect, the cable is supported by both the second and third planar portions.

In a further feature of this aspect, the equipment cabinet further includes a cable clip, supporting the cable, adapted to mount to a user-selected one of the vertical furcation bracket and the horizontal furcation bracket.

In a further feature of this aspect, the cable includes a furcation plug, and the clip is mounted to the furcation plug.

In a further feature of this aspect, the clip includes locking members adapted to be clipped into a user-selected one of the vertical furcation bracket and the horizontal furcation bracket.

The present invention according to another aspect is an equipment cabinet including an equipment cabinet, having a rack including a plurality of vertical frame members, a side panel, a central rack space within the vertical frame members, and a side panel space defined between one or more vertical frame members and the side panel; a vertical cable manager, disposed in the side panel space, having a vertically-oriented first planar portion mounted against one of the vertical frame members, an angled portion that angles away from the first planar portion, a vertically-oriented second planar portion having first and second opposed sides, the first side being connected to the angled portion such that the first and second planar portions are not coplanar, and a vertically-oriented trough connected to the second side of the second planar portion; and a cable having a first segment and a second segment, the first segment being routed vertically within the trough, the cable being supported by the first planar portion at a portion intermediate the first segment and the second segment, and the second segment of the cable being routed horizontally through the side panel space.

In features of this aspect, the vertical cable manager is disposed adjacent a rear of the equipment cabinet.

In a further feature of this aspect, the cable is routed horizontally from the vertical cable manager toward the front of the cabinet In a further feature of this aspect, the cabinet further includes a furcation bracket disposed in the side panel space.

In a further feature of this aspect, the cable is routed horizontally from the vertical cable manager toward the furcation bracket.

In a further feature of this aspect, the furcation bracket is a vertical furcation bracket.

In a further feature of this aspect, the furcation bracket is a horizontal furcation bracket.

In a further feature of this aspect, the furcation bracket comprises either a row or a column of pairs of slots.

In a further feature of this aspect, the cable includes a furcation plug adapted to attach to the furcation bracket.

In a further feature of this aspect, the furcation plug has locking members spaced from one another by a first length, furcation legs extending from the furcation plug, and connectors coupled to the furcation legs; and the slots in each of the pairs of slots in the furcation bracket are spaced from one another by a second length, wherein the second length is substantially equal to the first length for receiving the locking members of the furcation plug.

The present invention according to another aspect is an equipment cabinet having a fiber management system, including an equipment cabinet, having a rack including a plurality of vertical frame members, a side panel, a central rack space within the vertical frame members, and a side panel space defined between one or more vertical frame members and the side panel, the side panel space having opposing ends adjacent the front and rear of the equipment cabinet, respectively; a fiber management system, disposed in the side panel space, having a vertical cable manager disposed in a first of the opposing ends of the side panel space, a furcation bracket, and an elongate accessory bracket, mounted to the equipment rack in a second of the opposing ends of the side panel space and extending substantially the height of the equipment rack, having a plurality of fiber management accessories mounted thereon; and a cable having a first segment routed vertically in the vertical cable manager, a second segment supported by the furcation bracket, and a third segment supported by at least one of the fiber management accessories.

In a feature of this aspect, the plurality of fiber management accessories include a termination panel comprising an opening for receiving sockets sized to receive connectors on furcation legs of a trunk cable, wherein the termination panel is sized to be disposed in the equipment cabinet outside the central rack space. In a further feature of this aspect, the plurality of fiber management accessories include a fiber module bracket adapted to support a termination panel comprising an opening for receiving sockets.

In a further feature of this aspect, the plurality of fiber management accessories include a fiber retaining spool.

In a further feature of this aspect, the fiber retaining spool is a rotating spool.

In a further feature of this aspect, the fiber retaining spool includes a shaft and an arm extending from a distal end thereof.

In a further feature of this aspect, the elongate accessory bracket is a rail having a. C-shaped cross-section and includes first and second parallel legs extending from a back plate.

In a further feature of this aspect, the first leg of the rail includes a column of evenly-spaced openings for mounting the fiber management accessories to the accessory bracket.

In a further feature of this aspect, the furcation bracket is a vertical furcation bracket, and wherein the fiber management system further includes a horizontal furcation bracket.

In a further feature of this aspect, the rack includes a front-side vertical member and a rear-side vertical member, wherein the elongate accessory bracket is coupled to the front-side vertical member, wherein the vertical cable manager is coupled to the rear-side vertical member, and wherein the furcation bracket is disposed between the vertical cable manager and the elongate accessory bracket.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of principles of the invention, and are incorporated in and constitute a part of this specification. The drawings illustrate one or more embodiment(s), and together with the description serve to explain the principles and operation of the invention. It is to be understood that the various features of the invention disclosed in this specification and in the drawings can be used in any and all combinations.

DETAILED DESCRIPTION

Figure 1:
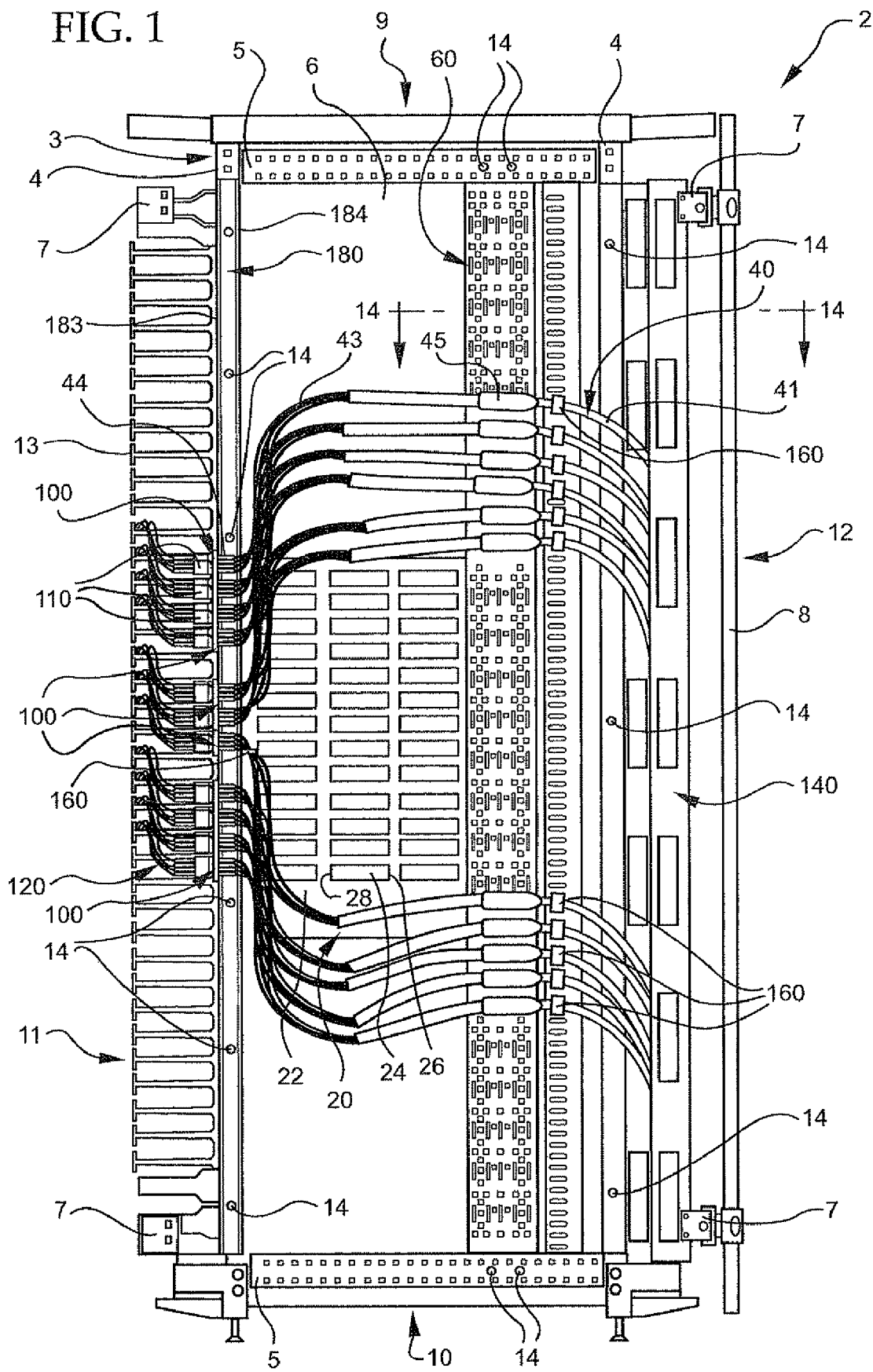
FIG. 1 is a right side view of a fiber management system, in accordance with one or more preferred embodiments, installed in an electronic equipment cabinet.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequencers) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention, Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

References to "top", "bottom", "front" and "back" are made with reference to the figures and are for convenience only; they do not mandate any absolute position or orientation. Finally, wherever applicable, like reference numerals refer to like elements.

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

An equipment cabinet includes a rack having a central rack space for mounting equipment, for example telecommunications equipment, wherein the equipment is connected to a network by cables. The equipment cabinet further includes organizational elements for mounting the cables so as to organize the cables within the cabinet, outside the central rack space. The cables may be organized to reduce impeding airflow to or from the equipment in the cabinet, and/or to reduce unwanted bending of the cables themselves, as the unwanted bending of the cables may cause network degradation or even failure. Further, the organization of the cables facilitates installation, moves, adds, and changes, of the cables and equipment within the cabinet. The organizational elements for mounting the cables may include one or more of: a trunk cable including a furcation plug and universal clip; a furcation bracket (either vertical or horizontal); a termination panel; a trunk cable manager; and/or an accessory bracket. The organizational elements may be used in various combinations with one another, depending upon the needs within the equipment cabinet, and may be provided in a kit. By providing the organizational elements in a kit, the user is guaranteed that the organizational elements will assemble and work together without attempting to cross-reference component specification sheets or have to field trial compatibility, which takes considerable time and money.

Figure 1A:
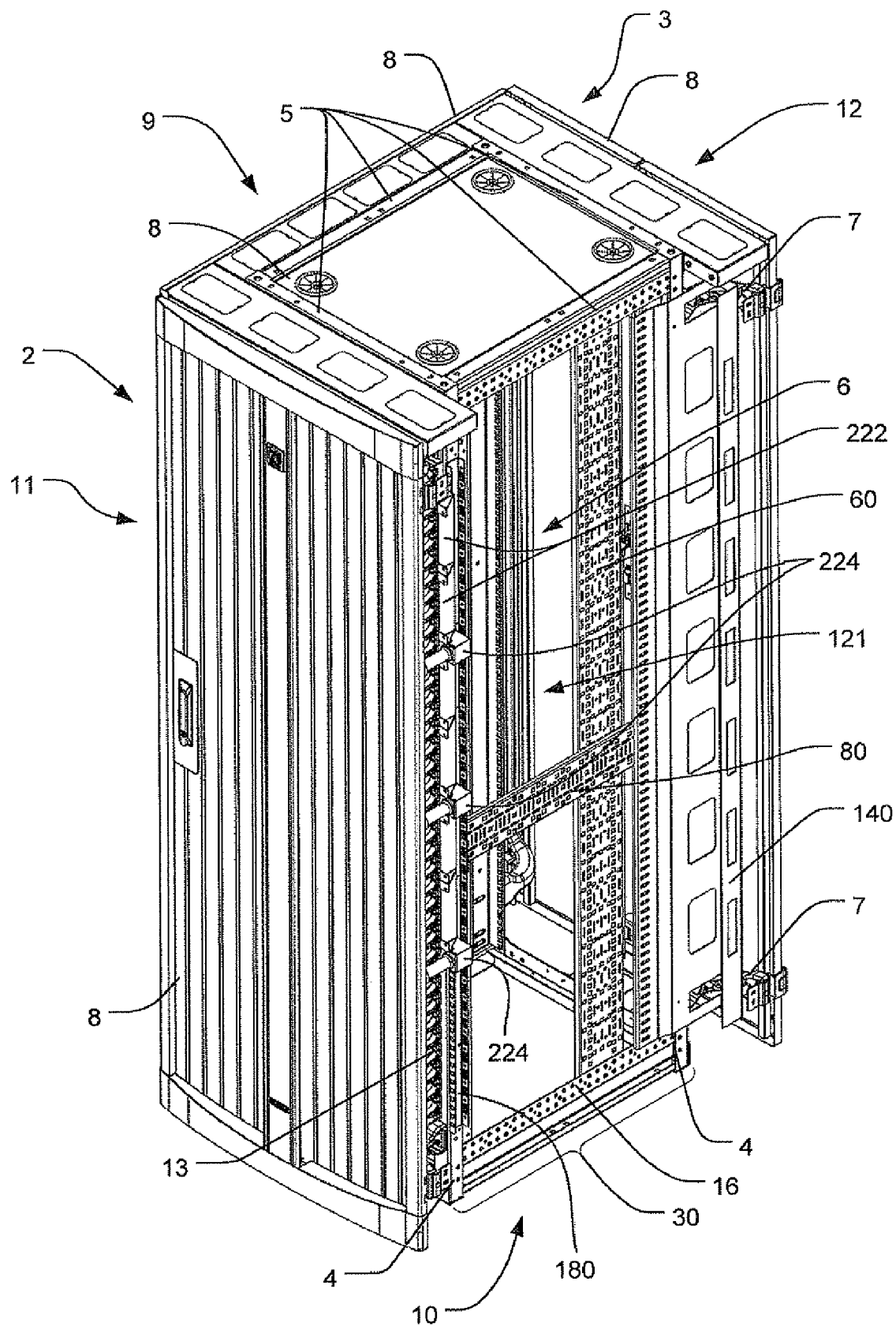
FIG. 1A is an isometric view of a fiber management system, also in accordance with one or more preferred embodiments, installed in a similar electronic equipment cabinet to that of FIG. 1.
Figure 1B:
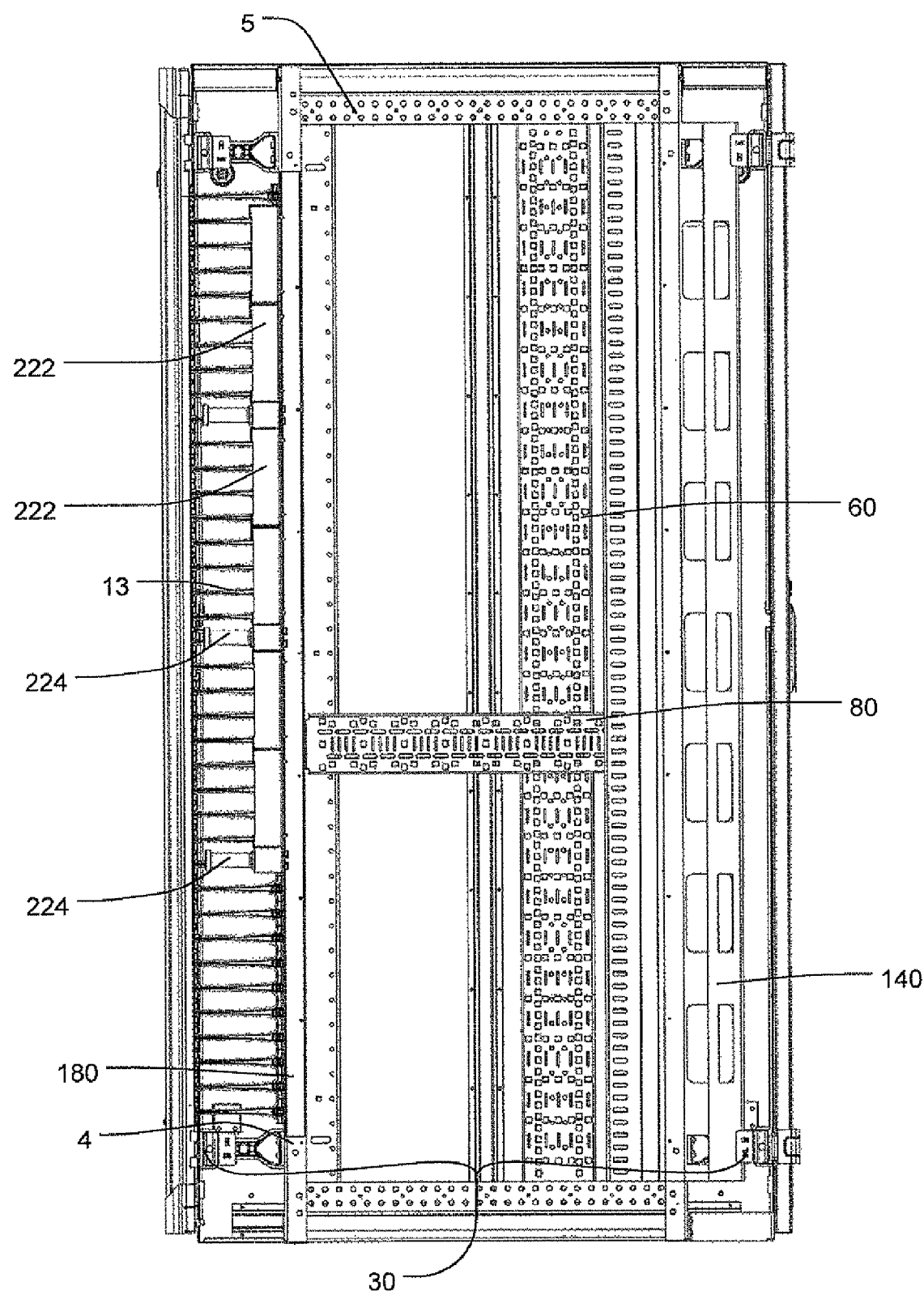
FIG. 1B is a right side view of the fiber management system and electronic equipment cabinet of FIG. 1A.

FIG. 1 is a right side view of a fiber management system, in accordance with one or more preferred embodiments of the present invention, installed in an electronic equipment cabinet, while FIGS. 1A and 1B are an isometric view and a right side view, respectively, of a generally similar fiber management system 30, also in accordance with one or more preferred embodiments of the present invention, installed in a similar electronic equipment cabinet. As shown in FIGS. 1 and 1A, an equipment cabinet 2 is generally oriented so as to have a top 9, a bottom 10, a front 11, and a rear 12. Again, reference to direction is made for convenience only. The equipment cabinets 2 of FIGS. 1, 1A and 1B may be of the type sometimes referred to as "expanded" equipment cabinets. Such cabinets are more fully disclosed and described in patent application Ser. No. 11/837,538, which published as US Publication No. US 2008 0037228 A1 and which is, together with the publication thereof, incorporated herein by reference, but a short description is presented here for clarity. The equipment cabinet 2 includes an interior four-post frame structure 3, generally referred to herein as an equipment rack, and may include panels 8 surrounding the equipment rack 3, thereby taking the form of an enclosure, but may also be used without such panels 8 thereby having an open configuration. When the equipment cabinet 2 includes panels 8, the panels may be coupled to the equipment rack 3 by brackets 7. FIG. 1 shows a panel 8 mounted to the rear 12 of the equipment cabinet 2, while FIGS. 1A and 1B show a two-door panel 8 mounted to the rear 12 of the equipment cabinet 2, a single-door panel mounted to the front 11 of the equipment cabinet 2, a side panel 8 mounted to the left side of the equipment cabinet 2, and a top panel, plus top panel expansion elements, mounted to the top 9 of the equipment cabinet 2. Further, the brackets 7 may include hinges for mounting selected panels 8 or door portions thereof, for example those at the front 11 and/or rear 12 of the equipment cabinet 2, so that the interior of the equipment cabinet 2 may be accessed by swinging the door panels 8 about the hinges.

As shown and described, the equipment rack 3 is formed from a plurality of frame members including four vertical members 4 and upper and lower front, rear, and side horizontal members 6. Each vertical member 4 includes a plurality of cross member attachment apertures at each end. Two of the vertical members 4 are coupled together at their upper and lower ends by the upper and lower front horizontal members 5, respectively, and the other two vertical members 4 are coupled together at their upper and lower ends by the upper and lower rear horizontal members 5, respectively. The front cross horizontal members 5 and their respective vertical members 4 thus define a front frame, and the rear horizontal members 5 and their respective vertical members 4 define a rear frame. The front and rear frames may then be coupled together at their respective corners by the upper and lower side (depth) horizontal members 5.

In the illustrated embodiment, each side horizontal member 5 includes an integrated horizontal mounting rail 16 (identified in FIG. 1A) that includes two rows of mounting apertures extending along its entire length. However, in other embodiments, the integrated horizontal mounting rails may be replaced by, or supplemented with, separate horizontal mounting rails that may be disposed at the top or bottom of the vertical members 4 or at any location therebetween. Furthermore, the mounting apertures in either the integrated or separate horizontal mounting rails may be replaced by longitudinal mounting slots running substantially the length of horizontal mounting rail, Typically, vertical mounting rails 15 may be mounted to the horizontal mounting rails 16. Each vertical mounting rail 15 preferably includes a series of evenly-spaced, threaded mounting apertures, extending along substantially its entire length, for use in mounting electronic components 20, peripheral devices, cable brackets, additional mounting members, or the like thereto.

Any known connection means may be used to join the various members together. Although not illustrated herein, at least one example of conventional connection means is described in U.S. Pat. No. 6,185,098, the entirety of which is incorporated herein by reference. Although likewise not illustrated herein, the precision and the stability of each of the corners of at least some types of four post frame structures may be enhanced by utilizing a self-squaring corner attachment bracket such as that disclosed by U.S. Pat. No. 5,997,117 entitled "RACK FRAME CABINET," the entirety of which is hereby incorporated by reference. Other connection means will likewise be apparent to the Ordinary Artisan.

Figure 1C:
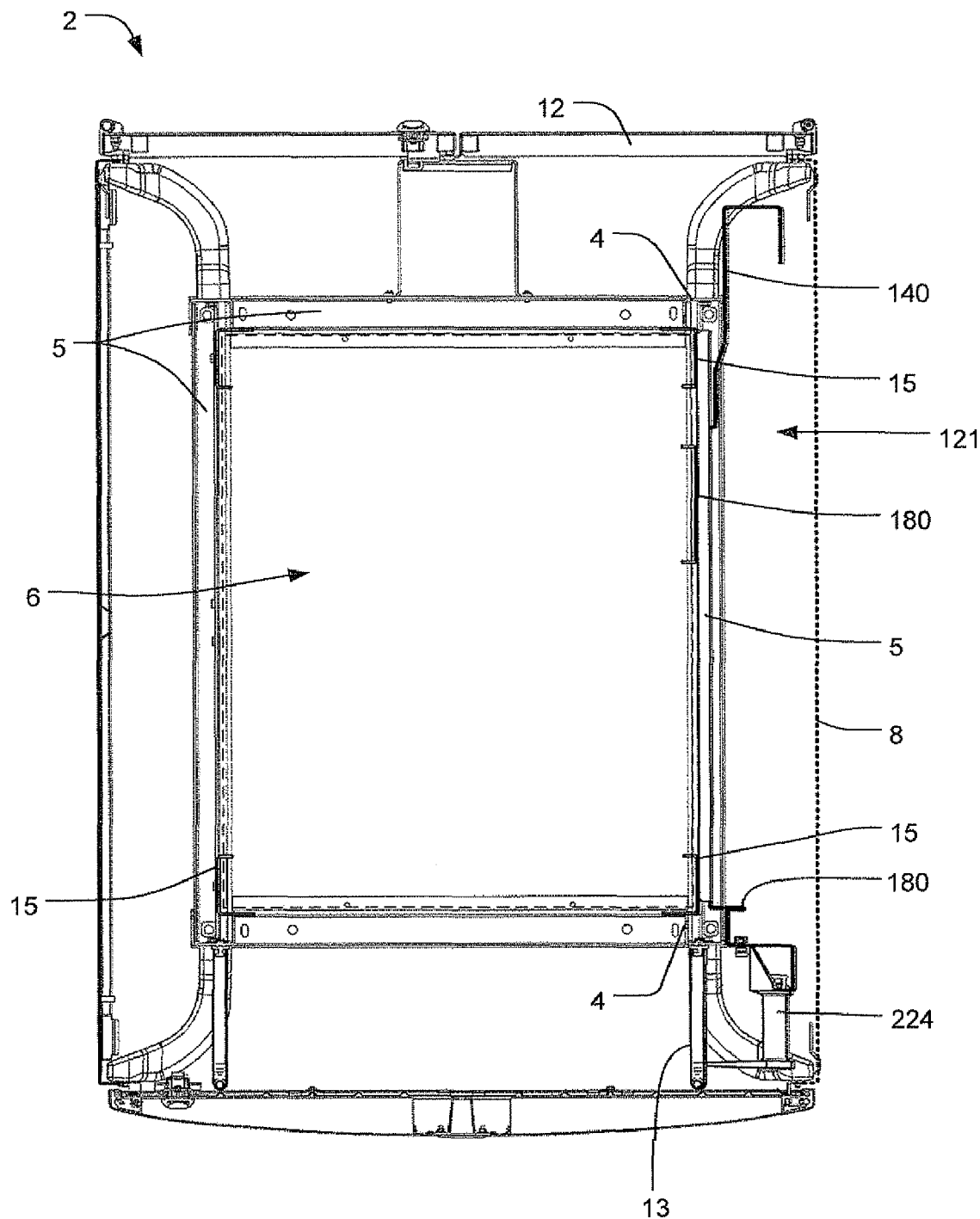
FIG. 1C is an enlarged top plan view of the fiber management system and electronic equipment cabinet of FIG. 1B, shown with the top panel removed and the location of the right side panel shown in broken lines.

FIG. 1C is an enlarged top plan view of the fiber management system 30 and electronic equipment cabinet 2 of FIG. 1B, shown with the top panel removed and the location of the right side panel 8 shown in broken lines. As shown therein, a central rack space 6 is defined, within the equipment cabinet 2, between the four vertical mounting rails 15 as shown in FIG. 1C. The central rack space 6, which is where electronic equipment 20 (shown in FIG. 1), accessories and the like are generally mounted, is in the form of a rectangular column of space generally bounded by the vertical mounting rails 15 and the top and bottom ends thereof. FIG. 1C also illustrates the substantial amount of available space 121, sometimes referred to herein as side panel space, outside the equipment rack 3 but within the front, rear and side panels 8, in which at least some portions of the fiber management system 30 may be located. In the expanded equipment cabinet used as an example herein, such space is created using an expansion kit that includes the brackets 7, oversized panels 8, and top panel extension elements and is more fully described in the aforementioned '538 application. However, although not illustrated herein, some equipment cabinets may utilize panels that are mounted directly to the vertical and horizontal members 4,5, or are at least mounted in very close disposition to the vertical and horizontal members 4,5, and thus have no space between the rack and the panels, but utilize vertical mounting rails that are displaced inwardly from the vertical members and may have space between those vertical mounting rails and vertical members. In at least one embodiment, one or more elements of the fiber management system 30 of the present invention are adapted for installation in such an arrangement.

The equipment 20 conventionally includes at least one wall 22 having airflow openings 24 therein. For many types of equipment, side openings 24, like those illustrated, are used to allow the equipment 20 to receive cooling air and exhaust heated air. Each airflow opening 24 defines a first side, established by one end 26 of the opening, and a second side, established by an opposite end 28 of the opening. Examples of the equipment 20 to be housed within the equipment rack 3 include switch equipment available from Cisco®, including the Cisco 9513 switch and the Cisco 6509 switch, as well as other types of equipment, for example, Storage Area Network (SAN) switches, servers, or Network Core Routers.

As depicted in the drawings, the equipment cabinet 2 also includes a plurality of conventional vertical cable management fingers 13. The fingers 13 are coupled to the front right vertical member 4 of the equipment rack 3 and extend outwardly away from the equipment rack 3. Cables being routed to and from equipment 20 mounted in the central rack mount space 6 of the cabinet 2 may be threaded through the vertical fingers to improve organization and reduce congestion within the cabinet 2.

Figure 2:
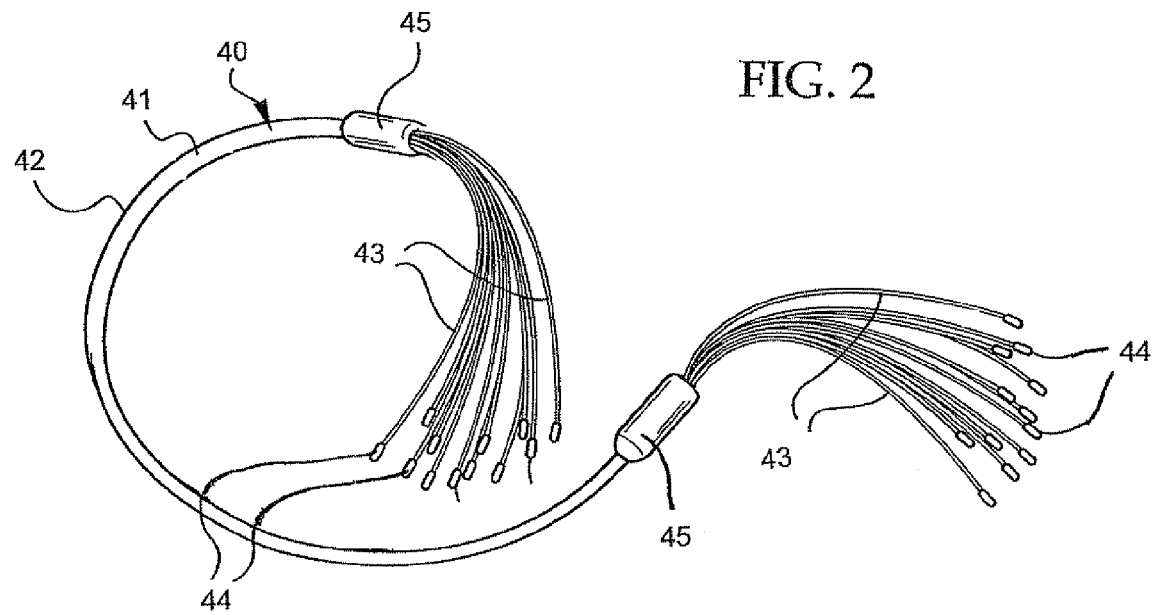
FIG. 2 is a perspective view of a trunk cable.

Though the present invention is applicable to a variety of cables, it may be particularly useful for managing trunk cables 40. Trunk cables 40 connect the equipment 20 to a network, for example a telecommunications network. A trunk cable 40 is shown in more detail in FIG. 2. Each trunk cable 40 includes a trunk portion 41 having an outer circumference 42. The trunk portion 41 may include multiple optical fibers, 12 to 864 fibers for example, or may include multiple copper wire pairs. For sake of simplicity in description, the trunk cable 40 will be described hereafter as including optical fibers. A furcation plug 45, also shown in FIG. 3, then splits off subsets of the optical fibers in the trunk portion 41 into smaller furcation legs 43, wherein each of the furcation legs 43 may include one or more optical fibers. Each of the furcation legs 43 terminates in a fiber connector 44 that is then coupled to a drop cable 120, shown in FIG. 1, wherein the drop cable 120 is ultimately coupled to the piece of equipment 20. The fiber connector 44 may be of any suitable type, for example, MT, LC, or SC. One or more vertical cable management fingers 13, coupled to the equipment rack 3, may guide the drop cables 120 from the side of the cabinet 2 to the front 11 where the drop cables 120 are plugged into the equipment 20.

The trunk cables 40 are organized within the cabinet 2 so as to avoid impeding airflow to and/or from the equipment 20, and so as to avoid unwanted bending in the trunk cables 40 themselves as such unwanted bending may cause network degradation or even failure. Further, the organization of the trunk cables 40 facilitates installation, moves, adds, and changes, of the trunk cables 40 and equipment 20 within the cabinet 2. In order to organize the trunk cables 40 in the equipment cabinet 2, there may be used one or more of each of the following organizational elements in any suitable combination: a furcation plug 45 including a universal clip 47; a furcation bracket (either vertical 60 or horizontal 80); a termination panel 100; a trunk cable manager 140,200; an accessory bracket 180; a fiber module bracket 222; and a rotating fiber retaining spool 224. The aforementioned organizational elements may be used in various combinations with one another, depending upon the needs within the equipment cabinet 2, may be provided in a kit, and are described in more detail below.

Figure 3:
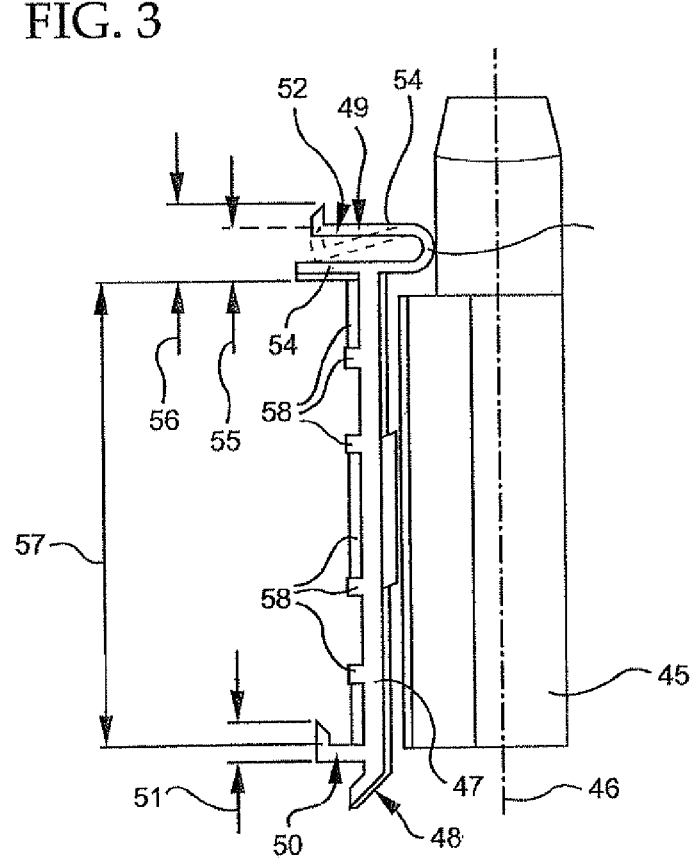
FIG. 3 is a side view of a furcation plug and universal clip of the trunk cable.
Figure 3A:
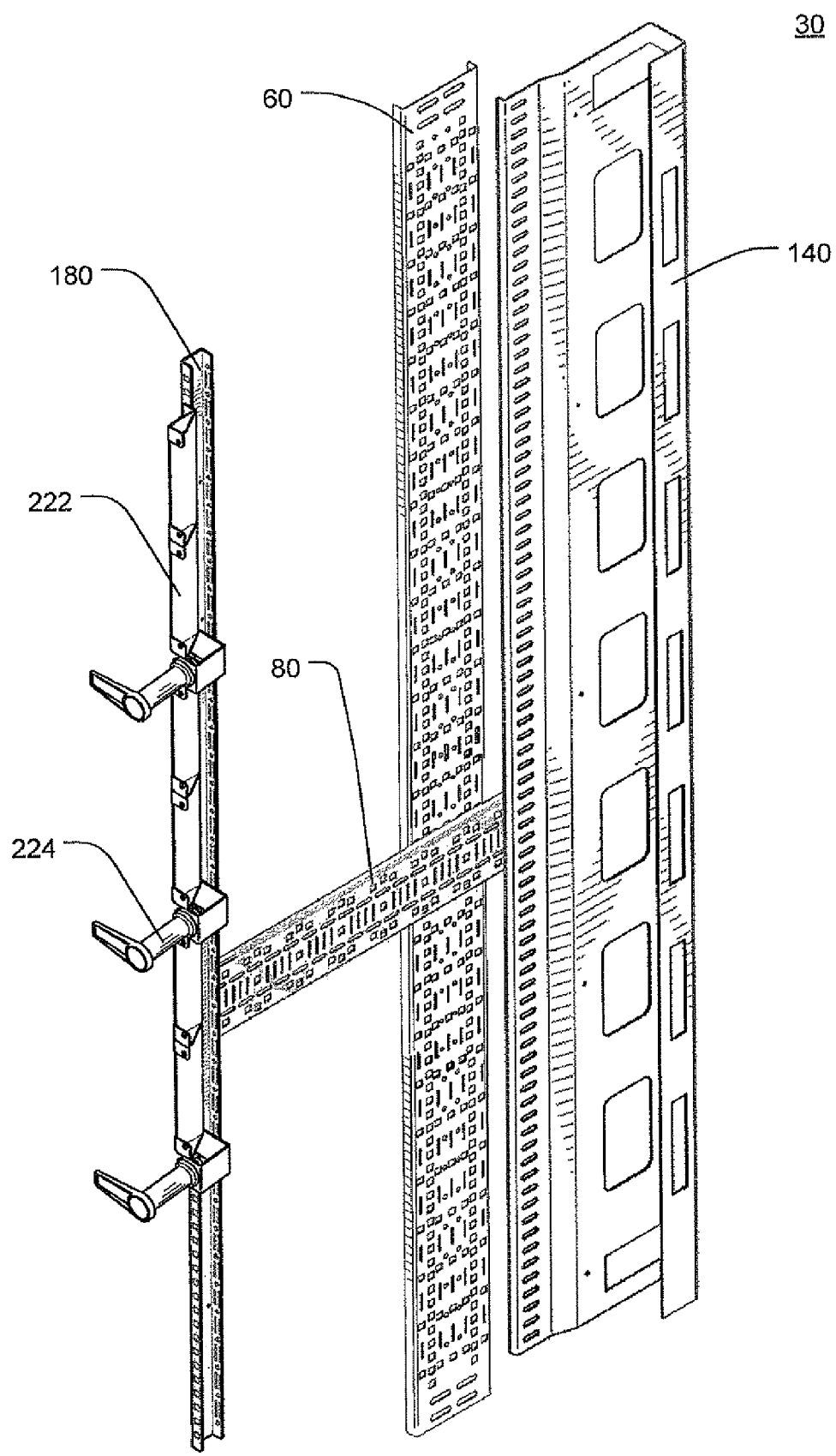
FIG. 3A is an isometric view of some of the elements of the fiber management system of FIG. 1A, shown in isolation from the equipment cabinet.

FIG. 3A is an isometric view of some of the elements of the fiber management system 30 of FIG. 1A, shown in isolation from the equipment cabinet 2. As shown therein, the elements include a universal accessory bracket 180, a vertical furcation bracket 60, a horizontal furcation bracket 80, and a trunk cable manager 140. Fiber module brackets 222 and rotating fiber retaining spools 224 are shown attached to the accessory bracket 180.

The universal accessory bracket 180 (sometimes also referred to as the vertical accessory rail) may be connected to, and preferably aligned with, any of the vertical members 4 of the equipment rack 3 (or, in a conventional non-expanded frame architecture, the accessory bracket 180 may be connected to a conventional vertical member). Similarly, the vertical trunk cable manager 140 may be connected to, and preferably aligned with, any of the vertical members 4 of the equipment rack 3. However, it will be appreciated that the universal accessory rail 180 and vertical trunk cable manager 140 are generally used in tandem, and when so used, will preferably not be connected to the same vertical member 4 of the equipment rack 3. It is contemplated that the universal accessory bracket 180 and vertical trunk cable manager 140, when used in tandem, will be disposed on adjacent vertical members 4, for example they may be disposed on the same side of the equipment cabinet 2 as one another and will be arranged such that one is disposed on the front vertical member 4 of the particular side and one on the rear vertical member 4 of the same side. Alternatively, in at least some embodiments, the universal accessory bracket 180 may be used without the vertical trunk cable manager 140, and similarly, the vertical trunk cable manager 140 may be used without the universal accessory bracket 180. As suggested previously, a particular implementation of a fiber management system may incorporate all of the elements shown in FIG. 3A (that is, the universal accessory bracket 180, the vertical trunk cable manager 140, the vertical furcation bracket 60, and the horizontal furcation bracket 80) or may include only a subset of these elements. The service for which the equipment cabinet 2 is being used will generally determine which components of the fiber management system 30 are used.

Further, it will be appreciated by the Ordinary Artisan that the location of the vertical furcation bracket 60 is not limited to that shown herein; rather, the vertical furcation bracket 60 may be located anywhere along the horizontal expanse of the side of the equipment rack 3 on which the vertical furcation bracket 60 is mounted. Similarly, the horizontal furcation bracket 80 may be located anywhere along the vertical expanse of the side of the equipment rack 3 on which the horizontal furcation bracket 80 is mounted.

Still further, in at least some embodiments, more than one vertical furcation bracket 60 may be utilized on the same side of the equipment rack 3, and in at least some embodiments, more than one horizontal furcation bracket 80 may be utilized on the same side of the equipment rack 3.

The fiber management system 30 enables variable and flexible deployments of fiber connectors 44 and fiber cable management in the limited space 121 found in the sides of an equipment cabinet 2, thus allowing for incremental deployments and flexible arrangements accommodating an as-you-go approach. It will be understood that the flexible system of brackets and accessories is not limited to fiber cabling applications, but could also be utilized for metallic (e.g. copper) cabling or flexible plumbing (e.g. polyethylene tubing).

The fiber management system 30 enables scaled deployment of fiber harnesses in storage area network (SAN) applications thereby dramatically reducing the cable congestion and simplifying the cable routing. The scalability of the system 30 further enables incremental deployment as the network expands by adding connectors and/or spool assemblies to the universal accessory bracket 180 as needed and where needed.

As indicated previously, management of the cable mass is important not just for ease-of-use, but also to promote proper airflow around the equipment. The fiber management system 30 accomplishes this additional task by containing the fiber bulk in the front of the cabinet 2 as well as the fiber trunk cables 40 in the rear of the cabinet 2 such that an air gap remains between the cables 40 and the side panel 8. This is significant for side-to-side breathing network equipment 20, such as switch equipment available from Cisco, as this space allows intake airflow to easily pass around the cables 40 and enter the air intake of the right side of the equipment.

The fiber management system 30 enables flexibility in allowing fiber connectors and cable management accessories to be installed at increments of one unit length (typically designated "U" or "RMU" in the art and generally being about 1.75 inches) vertically along the accessory bracket 180. Additionally, the system 30 enables scalability in allowing only the capacity of fiber connections required to be installed initially, and then upgraded as the network grows. Further, the system enables maintaining alignment with network equipment to facilitate logical network connections. Further, the system 30 provides containment such that air flow around the cables (between cables and side panel) is not sacrificed.

Additional details of the various elements of the fiber management system 30 of the present invention are described below.

Furcation Plug and Universal Clip

As shown in FIG. 3, the furcation plug 45 has a longitudinal axis 46 and a universal clip 47 in order to mount the furcation plug 45 at a desired position within the equipment cabinet 2. The universal clip 47 includes a first end 48 and a second end 49. At the first end 48 there is disposed a first locking member 50 having a length 51. At the second end 49, there is disposed a second locking member 52, having an arcuate portion 53 from which there extend two prongs 54. In a first, unbiased, state as shown in solid lines in FIG. 3, the second locking member 52 has a first length 56. The arcuate portion 53 is made of a resilient material so that the second locking member 52 may be bent to a second state, wherein the two prongs 54 touch each other as shown in dashed lines in FIG. 3, having a second length 55. Although only one of the prongs 54 is shown as deflecting from the first state to the second state, in an alternative embodiment, both prongs 53 may deflect to put the second locking member 52 in its second state, i.e., wherein the two prongs 54 touch each other and the second locking member 52 has second length 55. In either case, the second length 55 is shorter than the first length 56. Further, the first 50 and second 52 locking members are spaced from one another by a length 57. Over the length 57, there are disposed support members 58. As described below, the lengths, 51, 55,

56, and 57, are chosen relative to the lengths of, and spacings between, the slots in the furcation brackets 60,80 (described more fully hereinbelow) so that the furcation plug 45 easily may be mounted to and removed from various locations on the furcation brackets 60,80. The ability to mount the furcation plug 45 in different locations facilitates cabinet design, installation, moves, drops, and changes. Typically, the universal clip 47 would be molded from plastic so as to be relatively lightweight and relatively inexpensive. However, the universal clip 47 may be constructed from material other than plastic. As will be apparent, a plurality of furcation plugs 45 may be utilized with either or both of the horizontal or vertical furcation brackets 60,80.

Furcation Brackets

Figure 4:
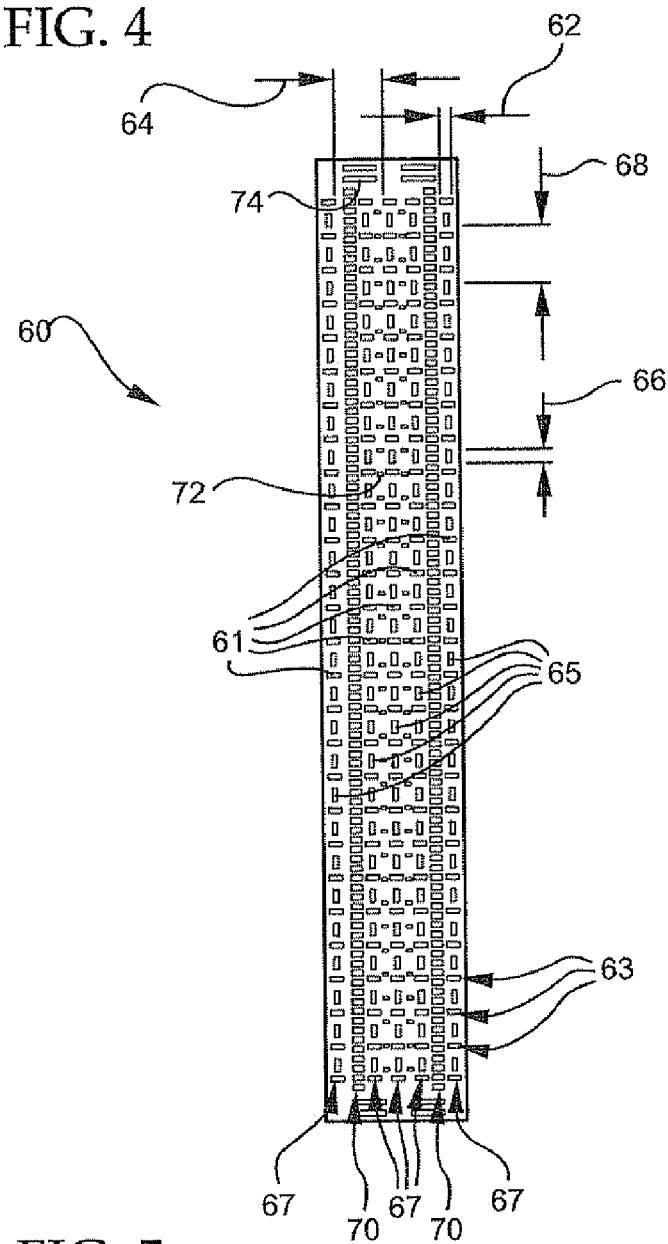
FIG. 4 is a front view of a vertical furcation bracket.

As shown in FIG. 1, the vertical furcation bracket 60 may be coupled to the horizontal members 5 of the equipment rack 3 by fasteners 14, and is shown in more detail in FIGS. 3A and 4. The fasteners 14 may for example include screws, bolts, pins, rivets, clips, or the like. The vertical furcation bracket 60 includes horizontal slots 61 and vertical slots 65 that are engaged by the universal clip 47 to mount a furcation plug 45.

With particular reference to FIG. 4, the horizontal slots 61 each have a length 62, and are disbursed over the area of the vertical furcation bracket 60 in rows 63. The length 62 is chosen to be substantially the same as, or slightly larger than, each of the length 51 of the first locking member 50 and the length 55 of the second locking member 52 in its second state. In FIG. 4, there are shown five horizontal slots 61 in each row 63, and twenty seven rows 63 of slots. However, any suitable number of horizontal slots 61 may be used in a row 63, and any suitable number of rows 63 may be used on the vertical furcation bracket 60. Further, although the same number of horizontal slots 61 are shown in each row 63, that need not be the case. In each row 63, pairs of the horizontal slots 61, which may be non-adjacent, are separated by a length 64. For example, as shown, a pair of the horizontal slots 61 may include two horizontal slots 61 that are separated by one other horizontal slot 61. Alternatively, a pair of horizontal slots 61 may include two adjacent slots 61 in a row 63. Still further, alternatively, a pair of horizontal slots 61 may include a pair of slots 61 separated by two, or three, or more, other horizontal slots 61 in a row 63. The length 64 is chosen to be substantially the same as the length 57 between the first 50 and second 52 locking members on the universal clip 47. Accordingly, the rows 63 of horizontal slots 61 provide flexibility in mounting the universal clip 47 at various locations, wherein the desired location may be chosen by a user when coupling the furcation plug 45 to the vertical furcation bracket 60. When coupling the furcation plug 45 to the horizontal slots 61, the longitudinal axis 46 will be in a generally horizontal orientation.

In at least one embodiment, the vertical slots 65 each have a length 66, and are disbursed over the area of the vertical furcation bracket 60 in columns 67. The length 66 is chosen to be substantially the same as, or slightly larger than, each of the length 51 of the first locking member 50 and the length 55 of the second locking member 52 in its second state. In FIG. 4, there are shown twenty six vertical slots 65 in each column 67, and five columns 67 of vertical slots 65. However, any suitable number of vertical slots 65 may be used in a column 67, and any suitable number of columns 67 may be used on the vertical furcation bracket 60. Further, although the same number of vertical slots 65 are shown in each column 67, that need not be the case. In each column 67, pairs of the vertical slots 65, which may be non-adjacent, are separated by a length 68. For example, as shown in FIG. 4, a pair of the vertical slots 65 may comprise two vertical slots 65 that are separated by one other vertical slot 65. Alternatively, a pair of vertical slots 65 may include two adjacent slots 65 in a column 67. Still further, alternatively, a pair of vertical slots 65 may include a pair of vertical slots 65 separated by two, or three, or more, other vertical slots 65 in a column 67. The length 68 is chosen to be the same as the length 57 between the first 50 and second 52 locking members on the universal clip 47. Accordingly, the columns 67 of vertical slots 65 provide flexibility in mounting the universal clip 47 at various locations, wherein the desired location may be chosen by a user when coupling the furcation plug 45 to the vertical furcation bracket 60. When coupling the furcation plug 45 to the vertical slots 65, the longitudinal axis 46 will be in a generally vertical orientation.

The vertical furcation bracket 60 may also include other mounting structures, for example, columns 70 of horizontal slots, mounting holes 72, and mounting slots 74. The columns 70 of horizontal slots may be used to mount elements to the vertical furcation bracket 60 by, for example, hook-and-loop strip fasteners or plastic ties. Mounting holes 72 may be used to mount elements to the vertical furcation bracket 60 by, for example, screws, bolts, pins, rivets, or clips. Although shown as being generally in two columns between the columns 70 of horizontal slots, the mounting holes 72 may be disbursed over the area of the vertical furcation bracket 60. The mounting slots 74 may be used to attach, as by fasteners 14, the vertical furcation bracket 60 to a horizontal member 5 of the equipment rack 3. See, for example, FIG. 1. Alternatively, the mounting holes 72 may be used to mount the vertical furcation bracket 60 to either a horizontal member 5 or a vertical member 4. In either case, the vertical furcation bracket 60 is mounted in a generally vertical manner in the equipment cabinet 2.

Figure 5:
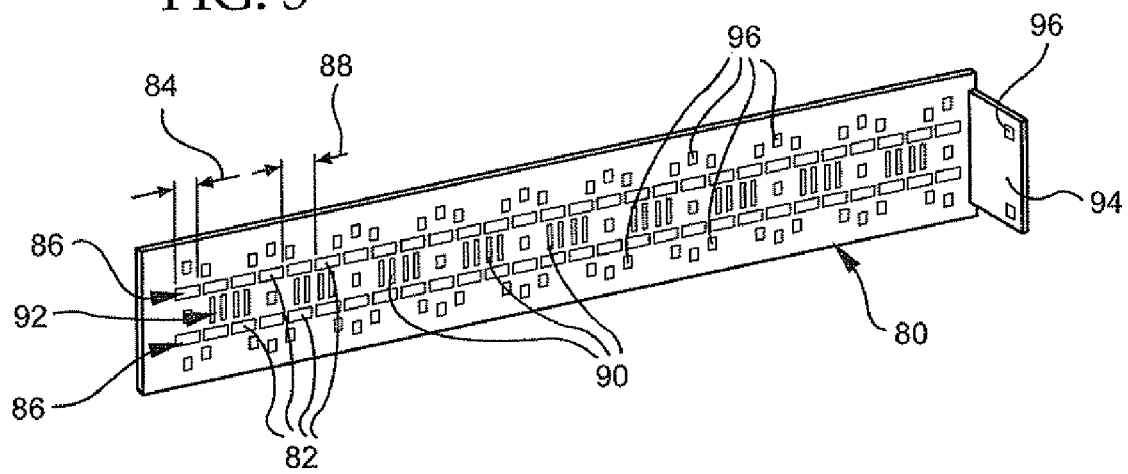
FIG. 5 is a perspective view of a horizontal furcation bracket.

The horizontal furcation bracket 80, which is shown in more detail in FIG. 5, may be coupled to vertical mounting rails 15 and/or an accessory bracket 180 of the equipment rack 3 by fasteners, with their relative dispositions perhaps best depicted in FIG. 1B. The horizontal furcation bracket 80 includes horizontal slots 82 that are engaged by the universal clip 47 to mount a furcation plug 45.

The horizontal slots 82 each have a length 84, and are disbursed over the area of the horizontal furcation bracket 80 in rows 86. The length 84 is chosen to be substantially the same as, or slightly larger than, each of the length 51 of the first locking member 50 and the length 55 of the second locking member 52 in its second state. In FIG. 5, there are shown twenty eight horizontal slots 82 in each row 86, and two rows 86 of horizontal slots 82. However, any suitable number of horizontal slots 82 may be used in a row 86, and any suitable number of rows 86 may be used on the horizontal furcation bracket 80. Further, although the same number of horizontal slots 82 are shown in each row 86, that need not be the case. In each row 86, pairs of the horizontal slots 82, which may be non-adjacent, are separated by a length 88. For example, as shown in FIG. 5, a pair of the horizontal slots 82 may include two horizontal slots 82 that are separated by one other horizontal slot 82. Alternatively, a pair of horizontal slots 82 may include two adjacent slots 82 in a row 86. Still further, alternatively, a pair of horizontal slots 82 may include a pair of slots 82 separated by two, three, or more, other horizontal slots 82 in a row 86. The length 88 is chosen to be substantially the same as the length 57 between the first 50 and second 52 locking members on the universal clip 47. Accordingly, the rows 86 of horizontal slots 82 provide flexibility in mounting the universal clip 47 at various locations, wherein the desired location may be chosen by a user when coupling the furcation plug 45 to the horizontal furcation bracket 80. When coupling the furcation plug 45 to the horizontal slots 83, the longitudinal axis 46 will be in a generally horizontal orientation.

The horizontal furcation bracket 80 may also include other mounting structures, for example, vertical slots 90 disposed in a row 92, a mounting bracket 94, and/or mounting holes 96. The vertical slots 90 in such row 92 may be used to mount elements to the horizontal furcation bracket 80 by, for example, hook-and-loop strip fasteners or plastic ties. Any suitable number of slots 90 may be disposed in any suitable number of rows 92. Mounting holes 96 may be used to mount elements to the horizontal furcation bracket 80 by fasteners, for example, screws, bolts, pins, rivets, or clips. As shown, the mounting holes 96 may be disbursed over the area of the horizontal furcation bracket 80 and/or on the mounting bracket 94. Additionally, the mounting holes 96 may be used to mount the horizontal furcation bracket 80 to the vertical 4 or horizontal 5 rails of the equipment cabinet. In either case, the horizontal furcation bracket 80 is mounted in a generally horizontal manner in the equipment cabinet 2.

Alternative variations of the vertical and horizontal furcation brackets 60,80 are shown in FIG. 3A. Either furcation bracket 60,80 may be, as shown for example in the horizontal furcation bracket 80 of FIG. 5, of a planar material of sufficient thickness to provide a desired rigidity, or may be, as shown for example in the vertical furcation bracket 80 of FIG. 3A, of a sheet material having two flanges, running the length thereof, to provide such rigidity.

Furcation brackets 60,80 provide attachment points for the trunk cable 40 furcation plugs 45, and tie-points for securing the trunk cables 40. Thus, the furcation brackets 60,80 allow trunk cables 40 to be positioned anywhere in the cabinet 2 for easy alignment with connecting points, so as to avoid airflow openings 24 in the equipment 20, and so as to organize the trunk cables 40 generally in one plane for easier moves, adds, or changes. The design of the brackets 60,80 is integrated with that of the furcation plugs 45 so the furcation plugs 45 snap in for easy installation and/or removal.

Termination Panel

The termination panel 100 typically will be coupled directly to a vertical member 4 near the front 11 of the equipment cabinet 2 as shown in FIG. 1, or to an accessory bracket 180, for example directly or via a fiber module bracket 222, that is mounted on a vertical member 4 near the front 11 of the equipment cabinet 2 as shown in FIGS. 1A-1C; however, other mounting locations are possible. The termination panel 100 is used to mount sockets 110 into which are plugged the connectors 44 on the ends of the furcation legs 43 of the trunk cable 40, and the connectors on the ends of the drop cables 120.

Figure 6:
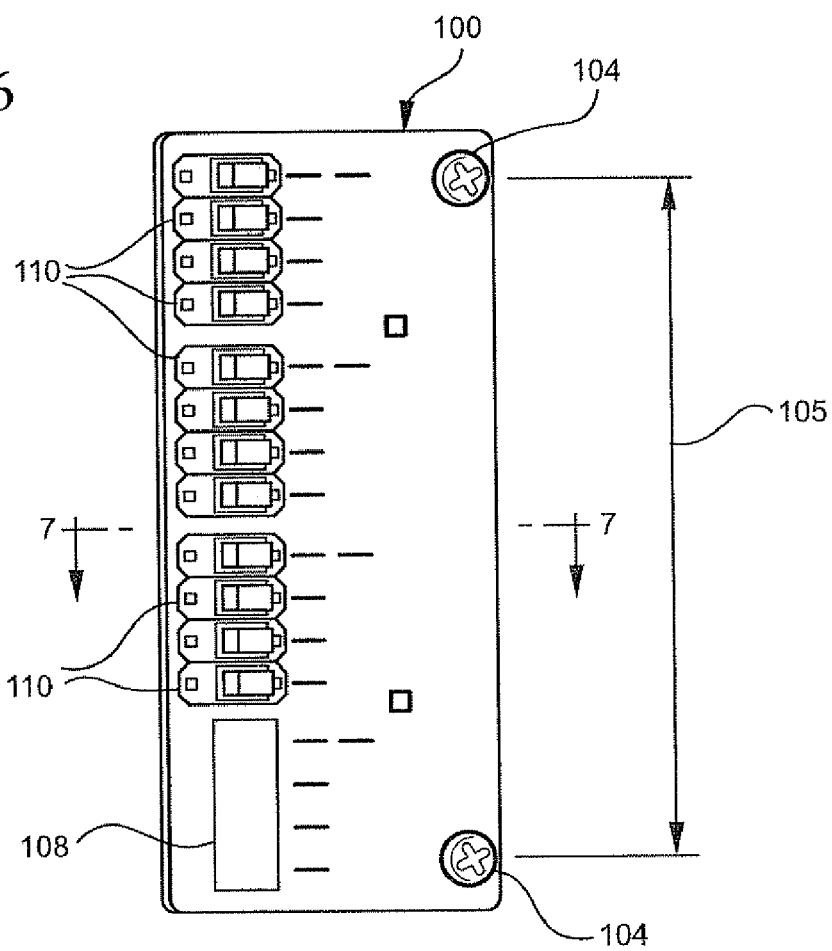
FIG. 6 is a front view of a termination panel.
Figure 7:
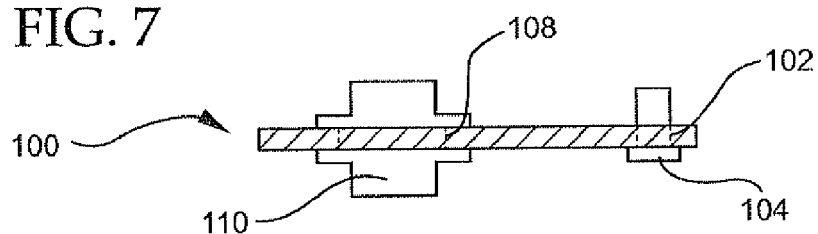
FIG. 7 is a cross-sectional view of the termination panel in FIG. 6.
Figure 8:
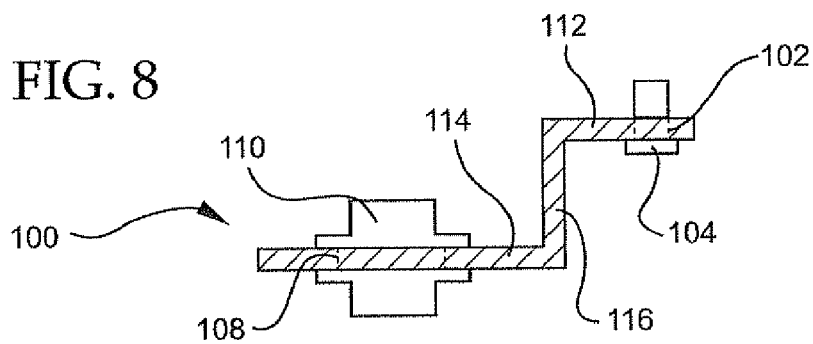
FIG. 8 is a cross-sectional view of a termination panel according to another embodiment.

One or more embodiments of a termination panel 100 are shown in more detail in FIGS. 6-8. Each termination panel 100 includes holes 102 through which fasteners 104 are inserted to couple the termination panel 100 to the equipment rack 3 or mounting portion thereof. The centers of the holes 102 are spaced from one another by a distance 105. Fasteners 104 may be screws, bolts, pins, rivets, clips, or the like. Alternatively, other manners of coupling the termination panel 100 to the equipment rack 3 may be used, for example, a snap-together fitting.

To mount the sockets 110, the termination panel 100 includes rectangular openings 108. The termination panel shown in FIG. 6 includes four rectangular openings 108 disposed in one column, wherein the top three rectangular openings 108 are each shown holding four sockets 110, while the bottom rectangular opening 108 is shown without sockets 110. The sockets 110 may be sized and configured to snap-fit into the rectangular openings 108 or may be attached to the termination panel 100 by any other suitable method, for example, by adhesive, fasteners, screws, bolts, pins, rivets, or the like. Alternatively, the rectangular openings 108 may be arranged differently on the termination panel 100. For example, instead of being aligned in one column, the rectangular openings 108 may be aligned in two columns that are disposed side-by-side. Further, for example, any suitable number of rectangular openings 108 may be used on any one termination panel 100. For example, as shown in FIG. 1, there are four termination panels 100, wherein the top panel 100 includes four rectangular openings 108 in a column, the next termination panel 100 down includes two rectangular openings 108 in a column, the next termination panel 100 down after that includes one rectangular opening 108 in a column, and the bottom termination panel 100 includes four rectangular openings 108 in a column. Although only one column can be seen in FIG. 1, there may be any suitable number of columns of rectangular openings 108. Still further, the rectangular openings 108 may be sized to fit any suitable number of sockets 110.

Each termination panel preferably has a height corresponding to a whole number of RMUs. In the embodiment of FIG. 6, the termination panel may occupy two RMUs. In another embodiment, one termination panel 100 includes two rectangular openings 108 that are arranged side-by-side so that the termination panel 100 only occupies a height of one RMU. In this case, the termination panel 100 would hold eight sockets 110, which corresponds to the number of connectors on a typical blade of a server. Accordingly, the one termination panel 100 would include all of the connections for one blade of the server, thereby facilitating moves, adds, or changes. That is, for example, when it is desired to disconnect one or more furcation legs 43 from a particular blade, the termination panel 100 corresponding to that blade may be uncoupled from the equipment rack 3 from the front 11 of the equipment cabinet 2 to access the side of the termination panel 100 on which the furcation legs 43 are plugged. Further, because one termination panel 100 includes all the connections for one blade, the change may be done without disturbing the other connections to other blades within the equipment cabinet 2. Similarly, if it is desired to remove one blade entirely, again, because all of the connections are made with one termination panel 100, the connections for that blade may be removed all together without disturbing the connections for other blades.

As shown in FIG. 7, the termination panel 100 may include a cross-section that is generally planar. Alternatively, as shown in FIG. 8, the termination panel 100 may include an attachment portion 112 and a socket mounting portion 114 that are offset relative to one another, i.e., they are not in the same plane. The offset is provided by a coupling portion 116 disposed between the attachment portion 112 and socket mounting portion 114. This latter configuration assists in providing an advantageous airflow in the equipment cabinet 2. That is, as shown in FIG. 1, a termination panel 100 having a planar cross-section may cause the furcation legs 43 to bunch together in front of the airflow openings 24 located near the front 11 of the equipment cabinet. However, a termination panel 100 having an offset would move the furcation legs 43 farther forward thereby leaving unimpeded the airflow openings 24 near the front 11 of the equipment cabinet 2.

Additionally, the configuration of FIG. 8 facilitates access to the furcation legs 43 for easier adds, changes, or drops. That is, by offsetting the sockets 110 forward from the attachment portion 112 (and the connection point to the rack or accessory bracket), there is provided additional room for a user to reach behind the termination panel 100, especially when the termination panels 100 are spaced along the height of the cabinet.

The termination panel 100 may be coupled to the equipment rack 3 so that the termination panel 100 is outside of the central rack space 6. As further described below, the termination panel 100 may be coupled to the equipment rack 3 by a universal accessory bracket 180, particularly through the use of a fiber module bracket 222.

Trunk Cable Manager

Figure 9:
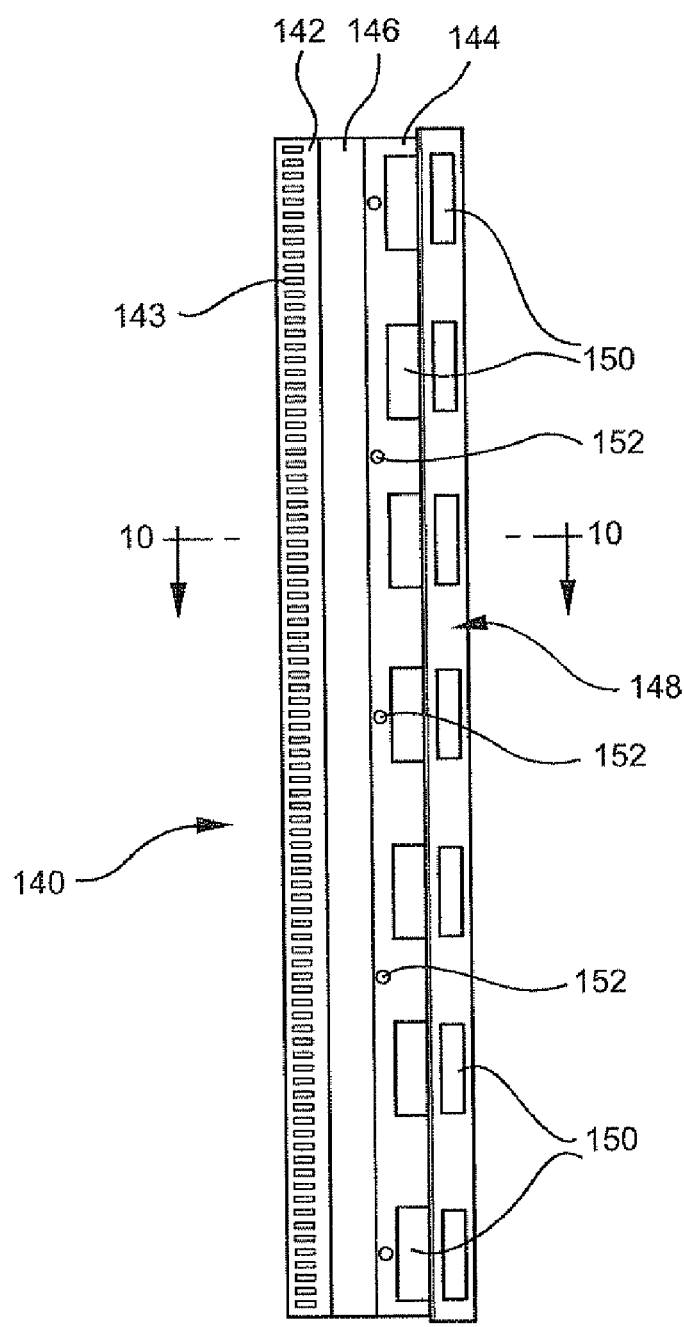
FIG. 9 is a right side view of the vertical trunk cable manager of FIG. 3A.
Figure 10:
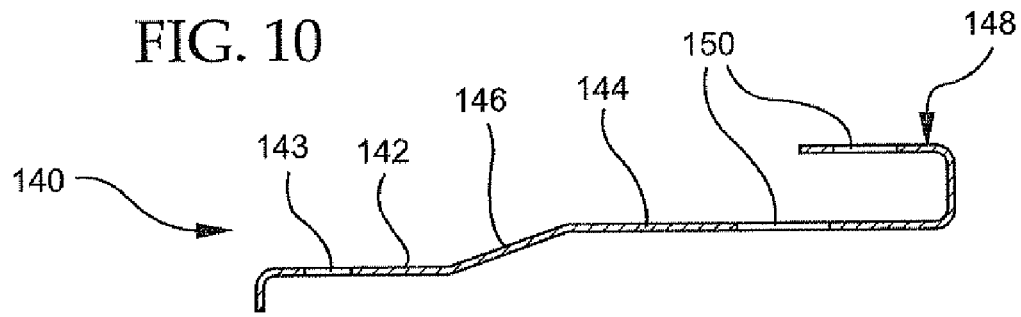
FIG. 10 is a top cross-sectional view of the vertical trunk cable manager in FIG. 9, taken along line 10-10.
Figure 10A:
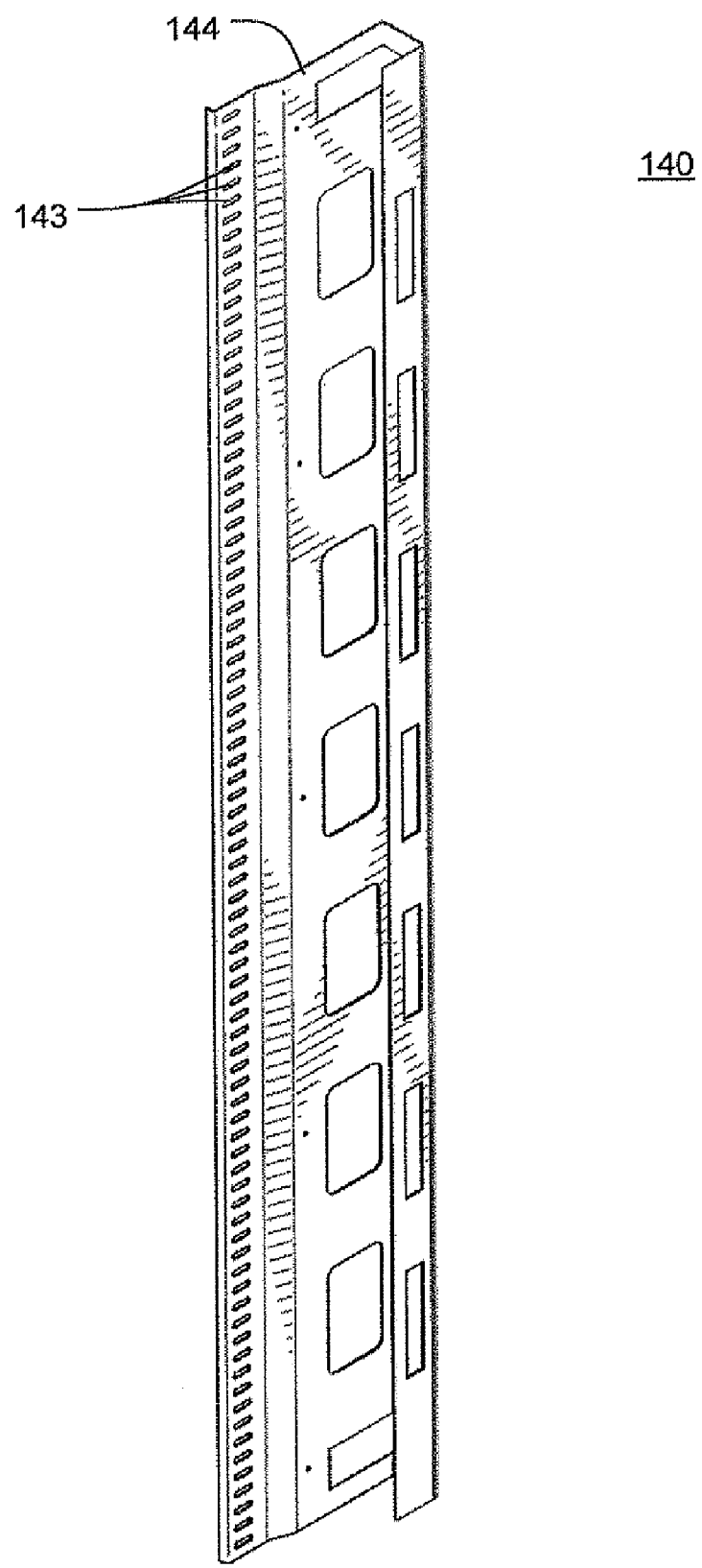
FIG. 10A is an isometric view of the vertical trunk cable manager of FIG. 3A.

FIGS. 9 and 10A are a right side view and an isometric view, respectively, of the vertical trunk cable manager 140 of FIG. 3A, and FIG. 10 is a top cross-sectional view of the trunk cable manager 140 of FIG. 9, taken along line 10-10. The trunk cable manager 140 is generally J-shaped with a longer side thereof being coupled to a vertical member 4 of the equipment rack 3 such that the rest of the cable manager 140 is directed into the side space or airflow region 121 of the cabinet 2. In at least some embodiments, the trunk cable manager 140 is installed alongside one vertical member 4 such that the closed end of the J-shape faces the nearer of either the front or rear of the equipment cabinet 2 and the open end of the J-shape faces toward the more distant of the front or rear of the equipment cabinet 2. For example, in the implementation illustrated in FIGS. 1A-1C, the trunk cable manager 140 is installed alongside the right-rear vertical member 4 such that the closed end of the J-shape faces the rear of the equipment cabinet 2, and the open end of the J-shape faces toward the front the equipment cabinet 2, which is more distant than the rear. This arrangement allows cables 40 to be routed through the open side of the J-shape toward other elements of the fiber management system 30 and/or equipment 20 mounted in the equipment rack 3. The long side of the cable manager 140 includes a series of horizontal slot-type openings 143 aligned vertically near the edge thereof.

The fiber trunk cable manager 140 supports and protects fiber trunk cables 40 as they transition from a generally vertical orientation to a generally horizontal orientation to make connections inside the cabinet 2. The cable manager 140 is often used in combination with the vertical furcation bracket 60 and provides strain relief so that the furcation plug 45 on the trunk cable 40 can mount properly to the vertical furcation bracket 60. In particular, the horizontal slot openings 143 of the cable manager 140 are used as tie points to support trunk cables 40 as they transition from a vertical orientation to a horizontal orientation before extending adjacent to the vertical furcation bracket 60. In at least one embodiment, the cable manager 140 is sized to support connections for two fully populated network switches 20.

Trunk cable manager 140 is coupled to the equipment rack 3 by fasteners 14 and provides support for the trunk cables 40 as they extend into the equipment cabinet 2 and toward the equipment 20. The trunk cable manager 140 supports the trunk cables 40 so as to reduce unwanted micro and/or macro bending, as well as to provide strain relief, protection, and vertical support. Further, the trunk cable manager 140 supports trunk cables 40 so as to reduce torsion on the universal clip 147 of the furcation plug 145.

The longer side of the trunk cable manager 140 includes a first planar portion 142 and a second planar portion 144 connected to one another by an angled portion 146. The angled portion 146 transitions the first planar portion 142 and second planar portion 144 so that they are not coplanar. As described in further detail below, this arrangement assists in reducing unwanted micro- and macro-bending in the trunk cables 40.

The first planar portion 142 includes horizontal slots 143 generally disposed in a column. The slots 143 may receive fastening members 160, shown in FIGS. 1 and 14, to hold the trunk cables 40. The fastening members 160 may include hook-and-loop strip fasteners or plastic ties, for example. The number and arrangement of slots 143 allows a user to fasten a trunk cable 40 at any of many various locations within the equipment cabinet 2, thereby providing flexibility in designing the cabinet 2.

The second planar portion 144 includes access openings 150 and mounting holes 152. The mounting holes 152 may receive the fasteners 14 therethrough to mount the trunk cable manager 140 to the equipment rack 3, Further, to one end of the second planar portion 144, there is coupled a trough 148, forming the bottom of the J-shape described previously, to support the trunk cables 40. The trough 148 may also include access openings 150 to permit, for example, manipulation of cables 40 running along the cable manager 140.

Figure 11:
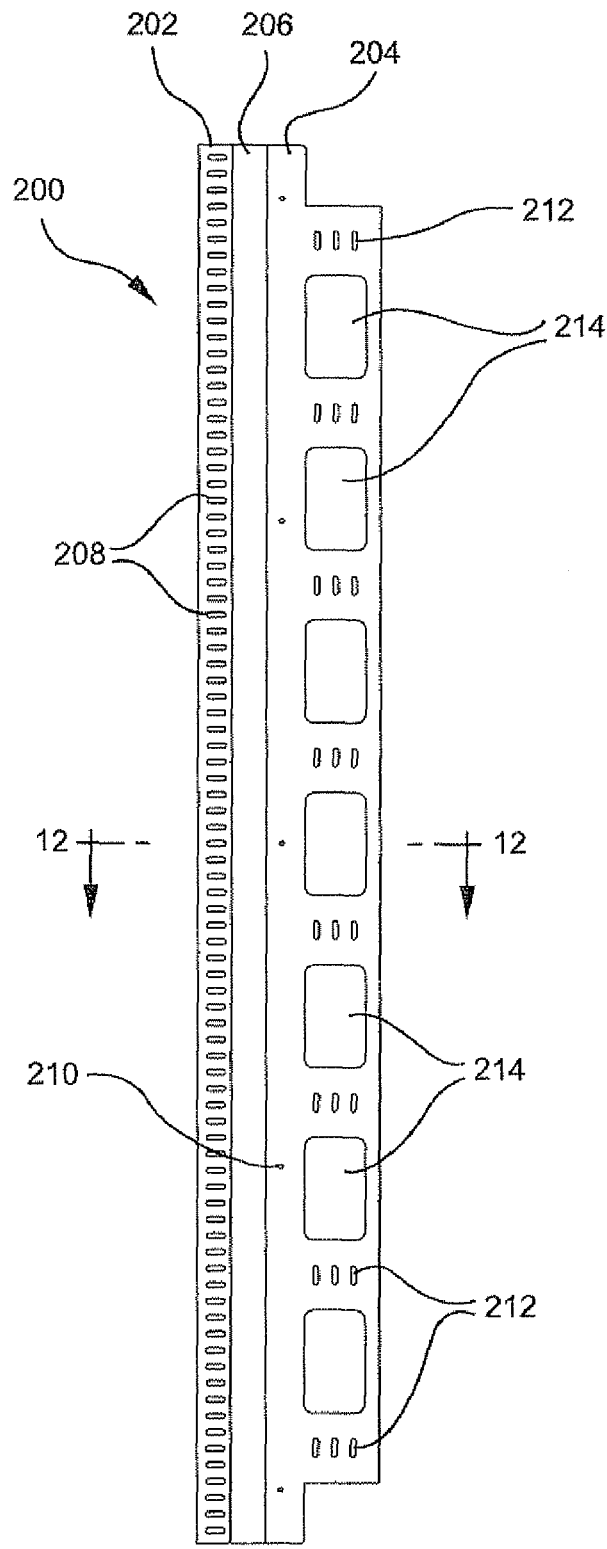
FIG. 11 is a front view of an alternative embodiment of a trunk cable manager.
Figure 12:
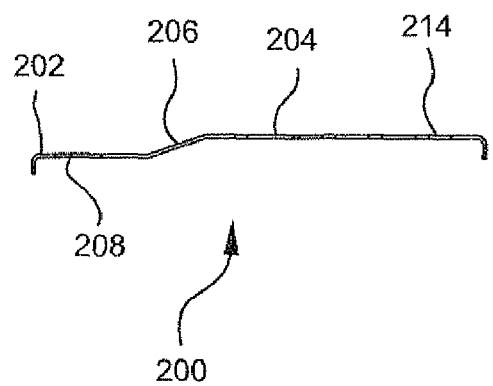
FIG. 12 is a top cross-sectional view of the trunk cable manager of FIG. 11, taken along line 12-12.

FIGS. 9, 10 and 10A illustrate a first embodiment of a vertical trunk cable manager 140, while FIG. 11 is a front view of an alternative embodiment of a trunk cable manager 200, and FIG. 12 is a top cross-sectional view of the trunk cable manager 200 of FIG. 11, taken along line 12-12. When viewed in cross-section, the trunk cable manager 200 of FIGS. 11 and 12 includes a leg generally similar to the longer side of the cable manager 140 of FIGS. 9, 10 and 10A but does not include a shorter leg, does not have a trough, and thus does not have a J-shaped cross-section. The trunk cable manager 200 includes a first planar portion 202 and a second planar portion 204 connected to one another by an angled portion 206. The angled portion 206 couples the first planar portion 202 and second planar portion 204 so that they are not coplanar. As described in further detail below, this arrangement assists in reducing unwanted micro- and macro-bending in the trunk cables 40.

The first planar portion 202 includes slots 208 generally disposed in a column. The slots 208 may receive fastening members 160 to hold and support the trunk cables 40. The number and arrangement of slots 208 allows a user to fasten a trunk cable 40 at any of many various locations within the equipment cabinet 2, thereby providing flexibility in design.

The second planar portion 204 includes mounting holes 210, vertical slots 212, and access openings 214. The mounting holes 210 may receive fasteners 14 therethrough to mount the trunk cable manager 200 to the equipment rack 3. The vertical slots 212 may receive fastening members 160 to hold and support the trunk cables 40. The number and arrangement of slots 212 allows a user to fasten a trunk cable 40 at many various locations within the equipment cabinet 2, thereby providing flexibility in design. As shown in FIG. 11, the slots 212 are provided in eight groups of three at various vertical positions along the trunk cable manager 200. Of course, more or less slots 212 may be disposed in any one group, and any number of groups of slots 212 may be provided along the length of the trunk cable manager 200. The access openings 214 permit, for example, manipulation of cables 40 running along the cable manager 200.

Accessory Bracket

Figure 13:
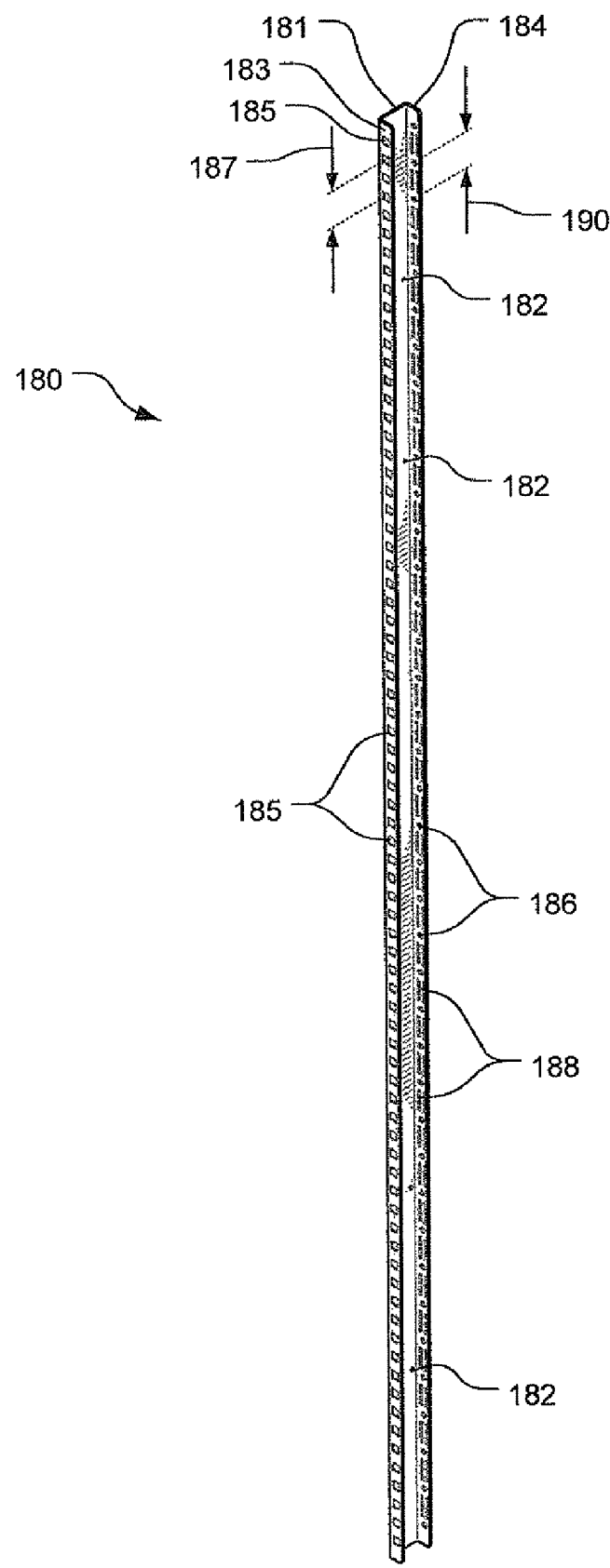
FIG. 13 is an isometric view of the accessory bracket of FIG. 3A.

FIG. 13 is an isometric view of the accessory bracket of FIG. 3A. As shown therein, the universal accessory bracket 180 is generally a C-shaped rail with a length that, in at least one embodiment, is generally equivalent to the height of the vertical member 4 to which it is mounted. The accessory bracket 180 includes a back plate or spine 181, a first leg 183, and a second leg 184. The back plate 181 includes holes 182 to receive fasteners 14 to mount the accessory bracket 180 to a vertical member 4 of the equipment rack 3. The first 183 and second 184 legs extend from the back plate 181, away from the vertical member 4 of the rack 3. Advantageously, the universal accessory bracket 180 may be mounted anywhere along the height of a vertical member 4 of the frame of the equipment rack 3, and in some embodiments, is shorter than the length of the vertical member 4 so as to facilitate selective use along the member 4. The universal accessory bracket 180, which may be constructed out of any rigid material, accepts a variety of brackets and accessories in a plurality of locations evenly distributed vertically along the length of the universal accessory bracket 180.

The first leg 183 includes mounting holes 185 for mounting equipment, for example a termination panel 100, a series of fiber module brackets 222 (each with or without a termination panel 100 mounted thereon), or the end of a horizontal furcation bracket 80, to the accessory bracket 180 and, thus, to the equipment rack 3. Pairs of holes 185, which may be non-adjacent, are spaced from one another by a distance 187, wherein distance 187 is the same as the distance 105 between holes 102 in the termination panel 100 of FIG. 6. As shown in FIG. 13, two holes 185 in a pair are separated by another hole 185; however, other configurations are possible. For example, the two holes 185 in a pair may be adjacent to one another, or spaced by two, three, or more, other holes 185.

The second leg 184 includes holes 186 and slots 188. The holes 186 may be used to mount equipment, for example a termination panel 100, a series of fiber module brackets 222 (each with or without a termination panel 100 mounted thereon), or the end of a horizontal furcation bracket 80, to the accessory bracket 180 and, thus, to the equipment rack 3. Pairs of holes 186, which may be non-adjacent, are preferably spaced from one another by a distance 190, wherein distance 190 is the same as the distance 105 between holes 102 in the termination panel 100. As shown in FIG. 13, two holes 186 in a pair are adjacent to one another, however, other configurations are possible. For example, the two holes 186 in a pair may be separated from one another by one, two, three, or more, other holes 186. Slots 188 may be used to receive a fastening member 160 for holding furcation legs 43 or other cables. As shown in FIG. 13, the slots 188 are arranged in fourteen groups of two along the length of the accessory bracket 180. Of course, any number of groups of slots 188 may be used along the length of the accessory bracket 1807 and any number of slots 188 may be used in any one group. Although the numbers of slots 188 in each group are shown as being the same, this need not be the case. Additionally, although the groups of slots 188 are shown as alternating with the holes 186 along the length of the accessory bracket 180, this also need not be the case. However, a uniform arrangement of termination panel mounting holes 185, equipment mounting holes 186, slots 188, provides for flexibility in mounting equipment to the accessory bracket 180.

FIGS. 15-18 are detailed isometric views of the accessory bracket 180 and fiber management accessories of FIG. 3A. As shown therein, various fiber management accessories may be attached to the rectangular shaped openings 185 of the exterior side arm 183 of the accessory bracket 180. It is preferred that the spacing of the rectangular shaped openings 185 be 0.5 RMU (0.875 inches) so as to coordinate with any of a variety of accessories making use of standardized RMU spacings. The spacing of the rectangular shaped openings 185 enables fiber management accessories to be aligned with electronic equipment contained in the rack mount space 6 of the equipment cabinet 2. Because the column of rectangular openings 185 extends the length of the exterior side arm 183, accessories may be attached anywhere along the length of the exterior side arm 183. Brackets and accessories that may be attached to the accessory bracket 180 include, but are not limited to, a high-density fiber MTP connector panel, a bracket 222 that accepts standard termination panels 100 and the like (such as standard closet connector housing ("CCH") fiber modules), termination panels 100 without a bracket 222, and a rotating fiber retaining spool 224. As discussed previously, the brackets and accessories can be installed on the accessory bracket 180 such that fiber connections are aligned with the equipment 20 or other apparatus to which the cables 40 are connected. This alignment makes the cabling easier to manage. In this regard, it will again be appreciated that brackets and accessories that attach to the accessory bracket 180 can support either copper or fiber connectors as well as cable management functions.

As previously mentioned, the interior side arm 184 includes a series of round openings 186 alternating with a series of vertical slot-type openings 188. It is contemplated that the slot-type openings 188 may be threaded with tie-down devices, e.g., Velcro® ties, for use in managing and organizing optical fibers in the side panel space 121. It is contemplated that the round openings 186 may be used to attach horizontal or vertical furcation brackets 80,60, respectively, to the accessory bracket 180. It will be understood that the round openings 186 and vertical slot openings 188 may be used as connection or attachment points for various components and/or accessories that are not specifically discussed herein, i.e., the functionality of the openings 186,188 should not be limited in any way by the description provided herein.

Figure 15:
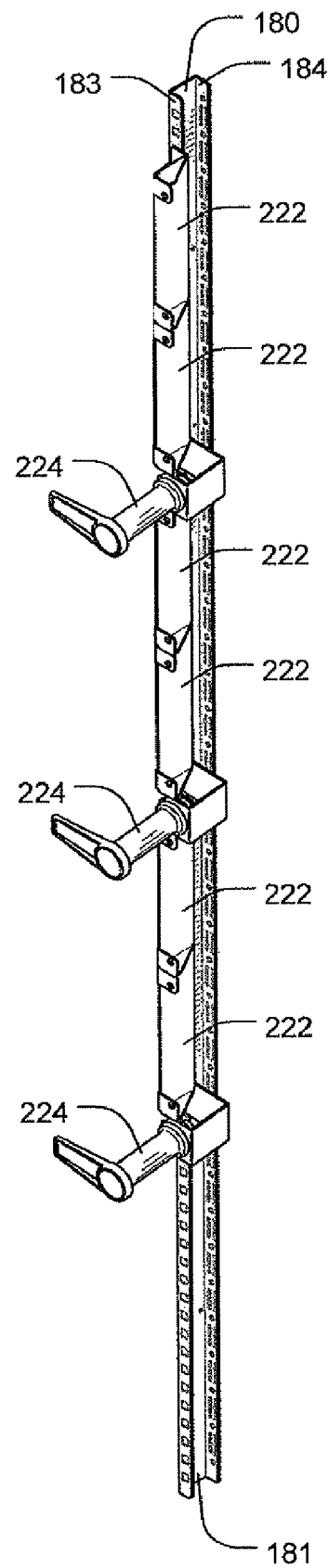
FIG. 15 is an isometric view of the vertical accessory rail and fiber management accessories of FIG. 3A.

FIG. 15 shows a plurality of rotating fiber retaining spool assemblies 224 and a plurality of fiber module brackets 222 attached to the accessory bracket 180.

Figure 16:
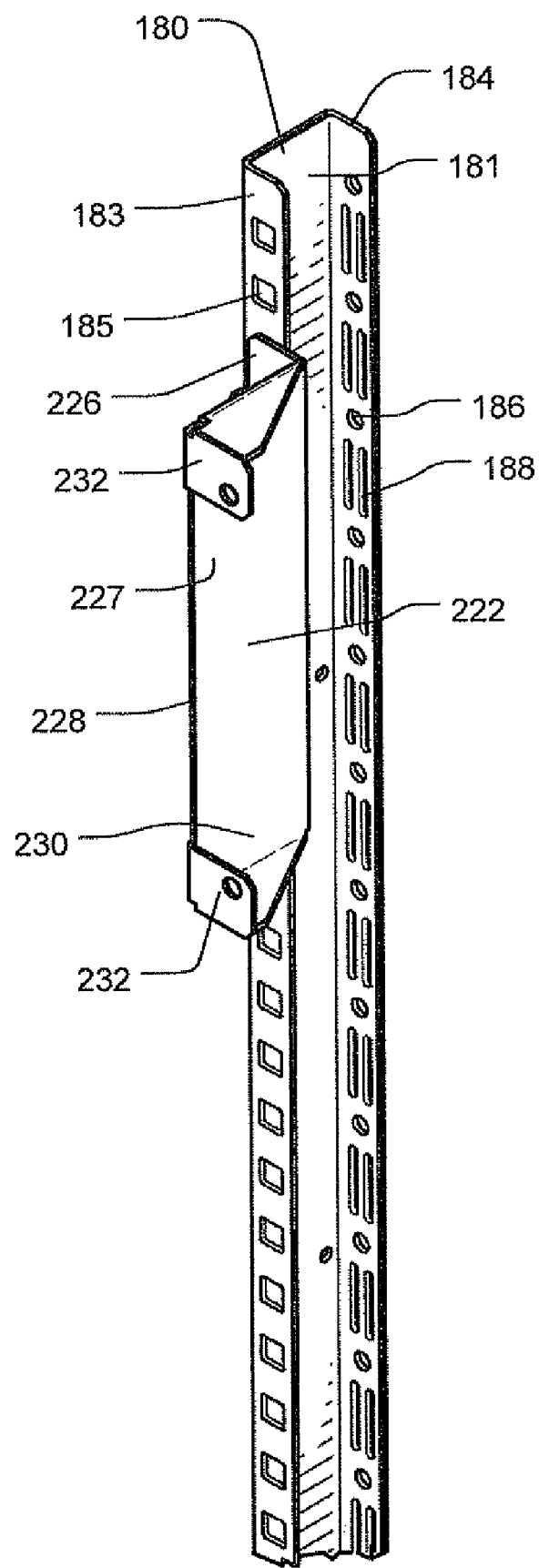
FIG. 16 is an enlarged fragmentary isometric view of the vertical accessory rail of FIG. 15 with a fiber module bracket attached thereto.

FIG. 16 shows a single fiber module bracket 222 attached to the accessory bracket 180. As shown in FIG. 15 the accessory bracket 180 may be heavily populated with fiber management accessories, which may be attached at various locations along the height of the accessory bracket 180. The fiber module bracket 222 accepts standard termination panels 100 and the like (such as CCH fiber modules). These modules are fiber connectors that enable quick connection of optical fibers. In addition, and as discussed previously, fiber connectors may enable fewer cables 40 to exit the connector than enter the connector because the connector may route more than one fiber through a single cable. For example an MTP connector can reduce the number of fiber cables from six duplex fiber cables to one 12-fiber cable. As also mentioned previously, the spacing and location of the rectangular openings 185 of the exterior side arm 183 enables the accessories, in this example, the fiber module brackets 222 to be aligned with the electronic equipment 20 and other apparatus contained in the rack mount space 6 of the cabinet 2.

In an exemplary scenario, a network core switch 20 utilizing side-to-side cooling airflow is housed in the rack mount space 6 of a cabinet 2. It is particularly beneficial for a fiber module bracket 222 containing a fiber connector to be vertically aligned with the network switch 20 in the rack mount space. This alignment enables optical fibers leaving the network switch 20 to patch into a fiber connector in the side panel space 121 immediately adjacent the network switch rather than having to travel into the side panel space 121 and be routed upward or downward, depending on where the fiber connector is housed in the rack mount space, through the side panel space 121 and back into a fiber connector housed in the rack mount space either above or below the network switch. Reducing the distance that optical fiber has to travel before patching into a fiber connector reduces optical fiber congestion.

Even in the situation wherein the number of fiber cables is not reduced by a fiber connector, congestion is reduced by locating the fiber connector nearer the network switch 20 because fiber cables are not traveling through the cabinet side space 121 to patch into a fiber connector. Fiber cables are routed directly to a fiber connector and then out of the cabinet 2 rather than taking a circuitous route through the cabinet 2 to patch into a fiber connector and then be routed out of the cabinet. Reducing fiber congestion increases organization within the cabinet 2 and improves thermal management within the cabinet 2, i.e., the less fibers there are congesting the side panel space 121, the more air is allowed to flow through the side panel space 121 thereby cooling the equipment housed in the cabinet 2.

Figure 17:
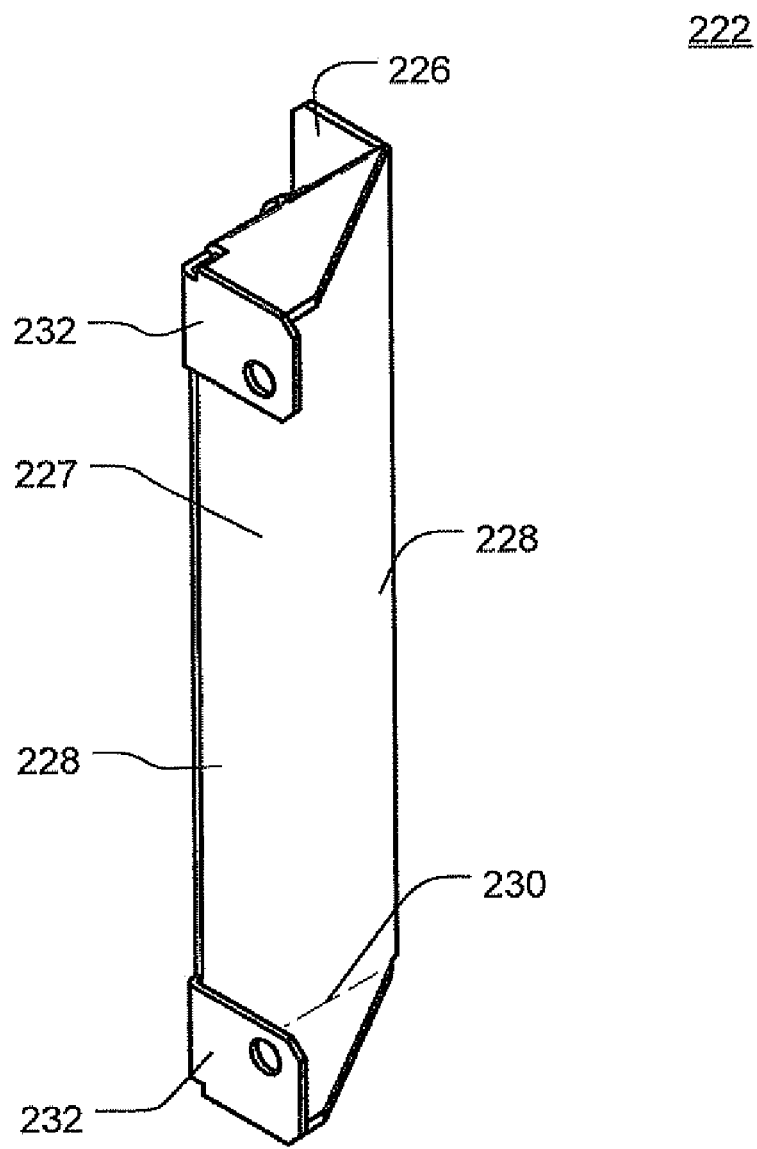
FIG. 17 is an enlarged isometric view of the fiber module bracket of FIG. 16.

FIG. 17 is an enlarged isometric view of the fiber module bracket 222 of FIG. 16. The bracket 222 is generally L-shaped, having two rectangular-shaped plates 226,227 that are in orthogonal relation to one another, thereby creating the L-shape of the bracket. A first plate 226 includes mounting holes for attaching the bracket to the accessory bracket 180. A second plate 227 has a pair of mounting tabs 232 projecting orthogonally from the side 228 of the plate 227 opposite the side 228 to which the first plate 226 is connected. The mounting tabs 232 are disposed adjacent the ends 230 of the second plate 227 and are for mounting of a termination panel 100 or other fiber module connector thereto. Each mounting tab 232 includes an aperture, with the placement of the apertures arranged to create a spacing similar to that of the distance 105 between holes 102 of the termination panel 100.

Figure 18:
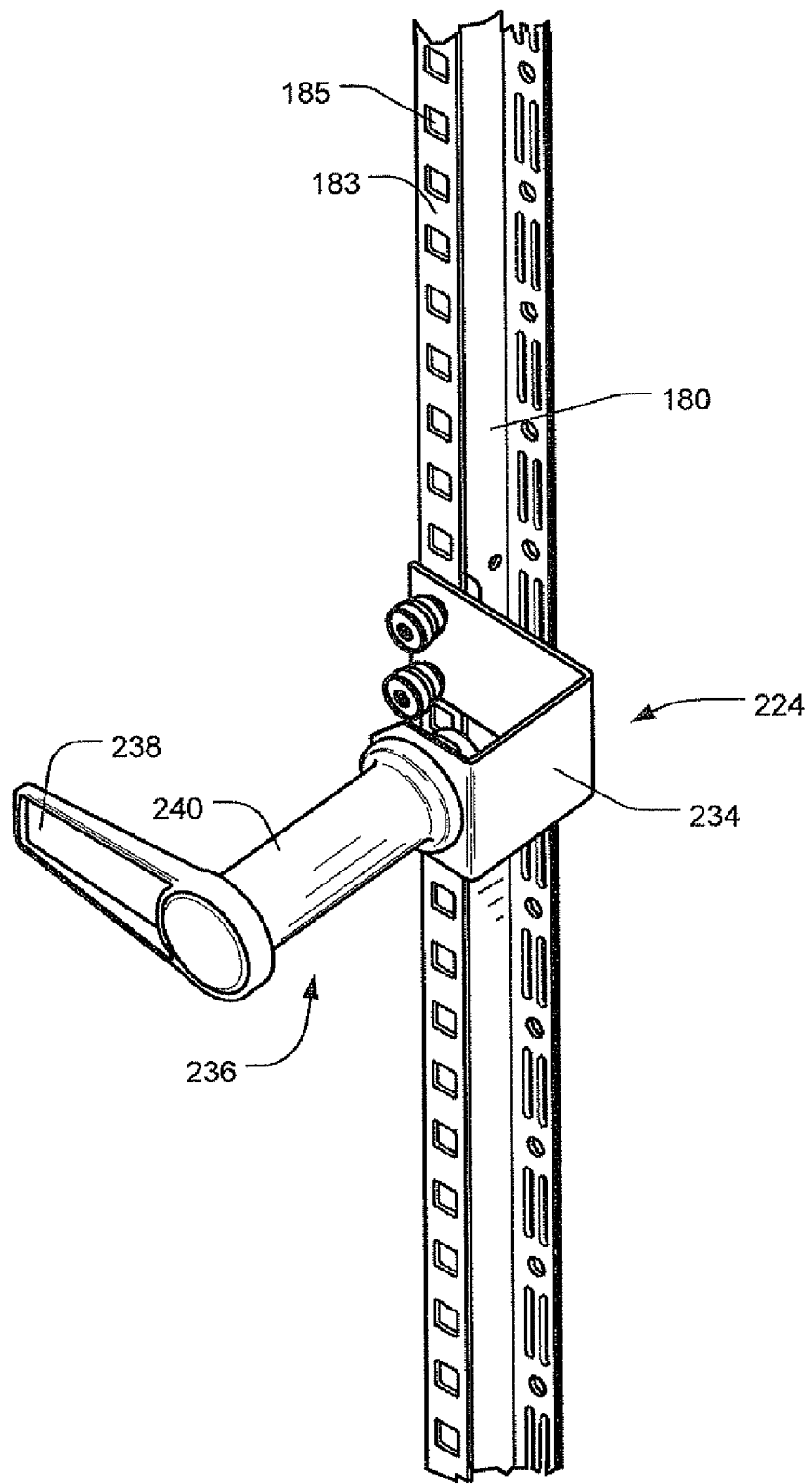
FIG. 18 is an enlarged fragmentary isometric view of the vertical accessory rail of FIG. 15 with a rotating fiber retaining spool attached thereto.

FIG. 18 is an enlarged fragmentary isometric view of the vertical accessory rail of FIG. 15 with a single rotating fiber retaining spool assembly 224 attached thereto. The spool assembly 224 includes a connection bracket 234 and a fiber spool 236. The spool 236 includes an arm 238 and a shaft 240 oriented orthogonally in relation to one another. The entire spool 236 rotates in relation to the connection bracket 234 to enable the arm 238 to be placed in various orientations. More specifically, the arm 238 may be placed at 0°, 90°, 180°, and 270° all relative to vertical. The spool 236 assembly may be placed anywhere along the height of the accessory bracket 180. A function of the spool assembly 224 is to guide and contain fiber cables present in a cabinet 2. The arm 238 of the spool 236 may be rotated to better enable the spool 236 to perform its function. For instance, the spool 236 may inhibit fiber cables from entering the door area or fiber connection areas in the cabinet 2. As such, the spool assembly 224 further aids in reducing congestion and improving organization within the cabinet 2. The fiber retaining spool 236 may also be rotated vertically to allow unimpeded access to the cable bundle during installation and maintenance. A suitable spool assembly 224 is more fully described in U.S. provisional patent application 61/020,741 and in co-pending U.S. patent application Ser. No. 12/349,619, filed Jan. 7, 2009 and entitled "REPOSITIONABLE SHELF-MOUNTED HANDLE SPOOL ASSEMBLY FOR CABLE ROUTING," the entirety of which is incorporated herein by reference.

Use of the Organizational Elements

There will now be described the use of the organizational elements in an equipment cabinet 2 so as to reduce impeding airflow to and/or from the equipment 20 in the cabinet 2, and so as to reduce unwanted bending of the cables 40 themselves. In order to reduce impeding airflow to and/or from the equipment 20 in the cabinet 2, the trunk cable 40 is preferably supported at two points adjacent to the equipment wall 22 in which the airflow openings 24 are located. Support at two points allows the trunk cable 40, particularly the furcation legs 43, to be routed in such a manner as to avoid or minimize covering the airflow openings 24.

In general, as shown in FIG. 1, the organizational elements are used to route the trunk cables 40 through the cabinet. The trunk cables 40 enter the bottom-rear of the cabinet 2 through the trunk cable manager 140. Alternatively, the trunk cables 40 may enter the top-rear of the cabinet, again through the trunk cable manager 140. In either case, the trunk cables 40 initially extend in a substantially vertical manner as they enter the equipment cabinet 2. As the trunk cables 40 transition to a horizontal orientation through the front of the trunk cable manager 140, the trunk cables 40 are secured to the trunk cable manager 140 by fastening members 160 coupled to a pair of slots 143 in the trunk cable manager 140. Instead of the trunk cable manager 140, the trunk cable manager 200 may be used in a manner similar to that described above.

The trunk cables 40 are then secured at a first point adjacent to the wall 22 by a vertical furcation bracket 60 by snapping the furcation plug 45 with universal clip 47 into a pair of slots. Although not shown in FIG. 1, a horizontal furcation bracket 80 may also be used for this purpose either instead of, or in addition to, the vertical furcation bracket 60. The furcation plug 45 with universal clip 47 may be coupled to the vertical furcation bracket 60 so that the longitudinal axis 46 is either in a horizontal or a vertical orientation. In either orientation, the furcation plug 45 may be coupled to the vertical furcation bracket 60 in many different locations due to the above-described arrangement of horizontal 61 and vertical 65 slots, and because the vertical furcation bracket 60 extends over a substantial portion of the height of the equipment cabinet 2.

In order to couple the furcation plug 45 to the vertical furcation bracket 60, for example, the first locking member 51 is inserted into a first one of the horizontal slots 61 in a row 63. Additionally, the second locking member 52 is moved from its first state to its second state wherein the second locking member 52 has second length 55. The second locking member 52 is then inserted into another horizontal slot 61 that is in the same row 63 and that is spaced from the first one of the horizontal slots 61 by a length 64. The second locking member 52 is then allowed to resume its first state having a length 56, thereby coupling the universal clip 47 and furcation plug 45 to the vertical furcation bracket 60. That is, the lengths 51 and 55 are chosen so as to be substantially the same as or slightly shorter than the length 62 so the first 50 and second 52 locking members can be inserted through the slots 61, whereas the lengths 57 and 56 together are greater than the lengths 62 and 64 so that the universal clip 47 securely may be coupled to the vertical furcation bracket 60. When the furcation plug 45 is coupled to the furcation bracket 60 in this manner, the support members 58 rest on the vertical furcation bracket 60 to assist in holding the furcation plug 45 and thus the trunk cable 40 in place. Again, in a similar manner a furcation plug 45 may be coupled in a vertical orientation to the slots 65 of the vertical furcation bracket 60, or may be coupled in a horizontal orientation to the horizontal slots 82 in the horizontal furcation bracket 80. In any event, the trunk cable 40 is then securely coupled at one point adjacent to the equipment wall 22 that includes the airflow openings 24.

The furcation legs 43 of the trunk cable 40 are then routed outside of the central rack space 6, and more particularly in the side space 121, and around the airflow openings 24, so as to avoid blocking the airflow openings 24 in the wall 22 of the equipment 20 that is mounted in the central rack space 6. The furcation plug 45 may be located at a height that is either above or below the height of the airflow openings 24, and have the axis 46 oriented in a generally horizontal manner. Alternatively, the furcation plug 45 may be mounted at a height that is the same as that at which the airflow openings 24 are located, but have its axis 46 oriented vertically so that the furcation legs 43 may still be routed around the airflow openings 24 without unwanted bending in the furcation legs.

After being routed around the airflow openings 24, the furcation legs 43 are coupled at a second point adjacent to the wall 22. By coupling the trunk cable 40 at two points adjacent to the wall 22, the trunk cable 40 can securely be held away from the airflow openings 24 to avoid impeding airflow to or from the equipment 20.

To secure the trunk cable 40 at a second point, connectors 44 on the ends of furcation legs 43 are coupled to sockets 110 in a termination panel 100, and the termination panel 100 is coupled to the rack 3 by the accessory bracket 180, with or without the use of a fiber module bracket 222. The accessory bracket 180 is coupled to the equipment rack by fasteners 14 inserted through holes 182. The accessory bracket 180 is shown in FIG. 1 as being mounted to a vertical member 41 and is mounted so as to be outside of the central rack space 6. In an alternative embodiment, the accessory bracket 180 may be mounted between two horizontal members 5. The termination panel 100 may then be coupled by fasteners 104 to either a pair of holes 185 in the first leg 183 of the accessory bracket 180, a pair of holes 186 in the second leg 184 of the accessory bracket 180, or a pair of holes in the mounting tabs 232 of the fiber module brackets 222. Fasteners 104 may be screws, bolts, pins, rivets, clips, or the like. As noted above, the distance 105 between holes 102 of the termination panel 100 is chosen so as to be the same as distance 187 and the same as distance 190. Additionally, because the holes 185 and holes 186 are located along the length of the accessory bracket 180, and because the accessory bracket extends over a substantial portion of the height of the cabinet 2, the termination panel 100 may be located at many various points along the height of the equipment cabinet 2, with or without the use of fiber module brackets 222, thereby facilitating organization of the trunk cables 40.

As an alternative, or additional, second point for securing the trunk cable 40, the furcation legs 43 may be coupled directly to the accessory bracket 180. More specifically, a fastening member 160 may be looped around the furcation legs 43, and looped through slots 188 to secure the furcation legs 43 directly to the accessory bracket 180. Because the columns of slots 188 are arranged along a substantial portion of the length of the accessory bracket 180, and because the accessory bracket 180 may extend over a substantial portion of the height of the equipment cabinet 2, the furcation legs 43 may advantageously be secured at many various points along the height of the equipment cabinet 2, thereby facilitating organization of the trunk cables 40.

As set forth above, the trunk cables 40 are supported to avoid the airflow openings 24 by two points of connection, i.e., connection of the furcation plug 45 to the vertical furcation bracket 60 and by the connection of furcation legs 43 to either the termination panel 100 or to the accessory bracket 180, or to both the termination panel 100 and the accessory bracket 180.

Next, there will be described the use of the organizational elements in an equipment cabinet 2 so as to reduce unwanted bending of the trunk cables 40, and so as to facilitate installation, moves, or adds.

As noted above, the trunk cables 40 enter the bottom-rear of the cabinet 2 through the trunk cable manager 140. Alternatively, the trunk cables 40 may enter the top-rear of the cabinet, again through the trunk cable manager 140. Because the trunk cable manager 140 is mounted outside of the central rack space 6 and is vertically oriented, the trunk cable manager 140 allows the cables 40 to transition vertically-to-horizontally, or vice versa, along the side of the cabinet 2 without interfering with the functionality of the cabinet doors 8, hinges on brackets 7 or equipment 20, which interference may otherwise lead to unwanted bending of the trunk cables 40. Further, the trunk cables 40 are disposed within the trough 148, or against the body of the alternative trunk cable manager 200, which provides support and strain relief to the cables 40. The support by the trough 148 also reduces unwanted bending in the trunk cables 40. As the trunk cables 40 transition to a horizontal orientation, the trunk cables are secured to the trunk cable manager 140 by fastening members 160 coupled to a pair of slots 143 in the trunk cable manager 140. Because of the numerous slots 143 disposed along the length of the trunk cable manager 140, the trunk cables 40 may be coupled to the trunk cable manager 140 adjacent to one another and substantially in the same plane, as opposed to on top of one another in a jumble. Accordingly, the trunk cable manager 140 also keeps the trunk cables 40 organized for future moves, adds or changes. That is, as shown in FIG. 1, the trunk cables 40 are organized one above another, and substantially in one plane so that any one may easily be accessed for installation, moves adds, or changes. Additionally, the vertical furcation bracket 60 (and/or horizontal furcation bracket 80) keep the furcation plugs 45 in substantially the same plane, to maintain the organization of the trunk cables 40 for easy installation, moves, adds, or changes.

Further, the trunk cable manager 140 may be used to support the trunk cables 40 so as to further preventing unwanted bending of the trunk cable 40, and so as to reduce the torsion on the universal clip 147, thereby increasing the useful life of the universal clip 147.

Figure 14:
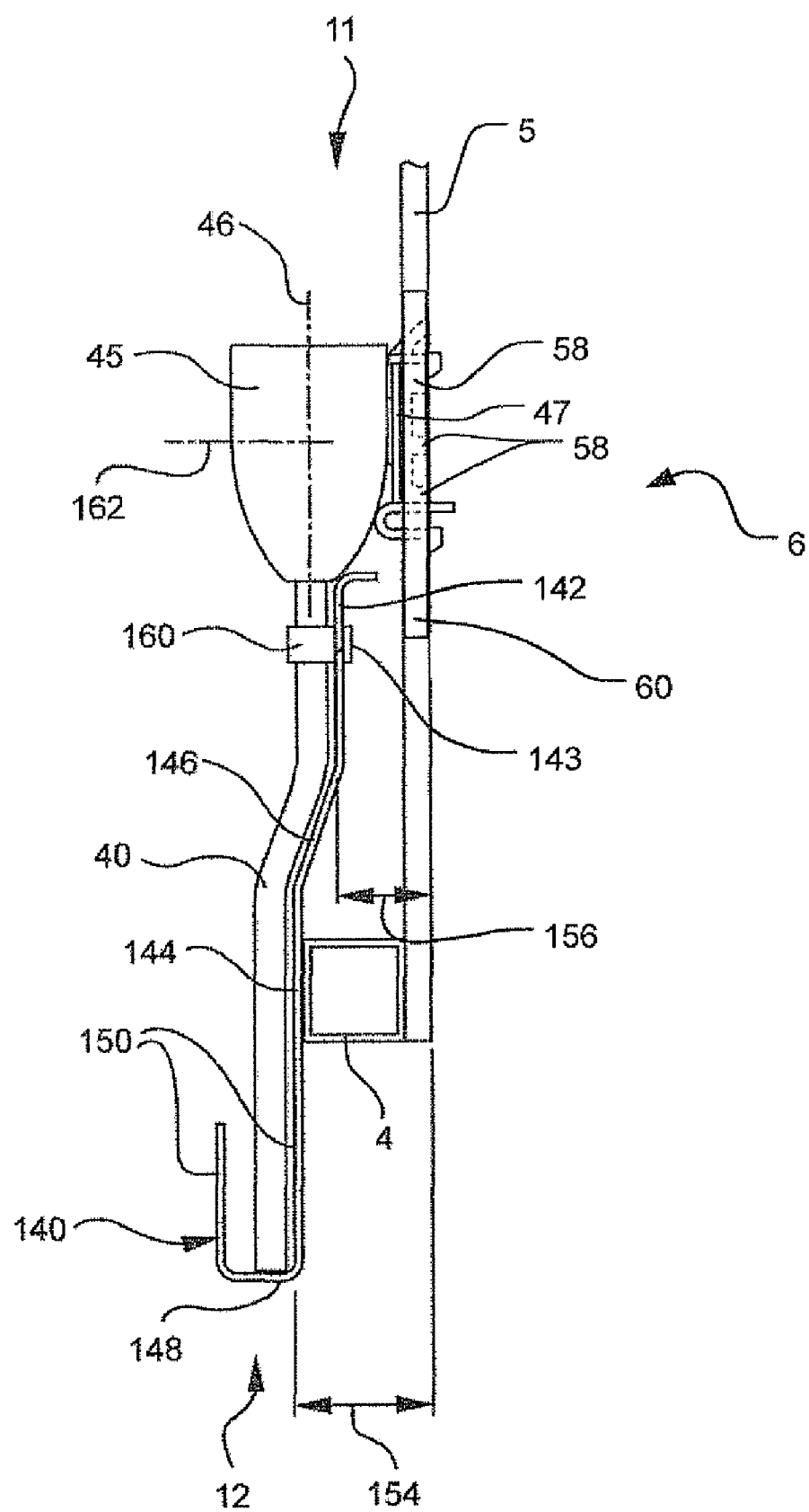
FIG. 14 is a top view of a trunk cable coupled to components in an equipment cabinet of FIG. 1, taken along line 14-14.

FIG. 14 is a top view of a portion of the equipment cabinet 2 of FIG. 1, taken along line 14-14. In FIG. 14, it is seen that the trunk cable manager 140 supports the trunk cable 40 so as to bend gently toward the central rack space 6 as the trunk cable 40 extends substantially horizontally from the rear 12 of the cabinet 2 toward the front 11. More particularly, the second planar portion 144 is coupled to the vertical member 4, and supports the trunk cable 40 at a first distance 154 from the vertical furcation bracket 60. The angled portion 146 of the trunk cable manager 140 then places the first planar portion 142—to which the trunk cable 40 is coupled by fastening member 160—at a second distance 156 from the vertical furcation bracket 60, wherein the second distance 156 is less than the first distance 154, to gradually move the trunk cable 40 toward its connection point with the vertical furcation bracket 60. By gradually moving the trunk cable 40 toward vertical furcation bracket 60, unwanted bending of the trunk cable is reduced. Also, the angled portion 146 acts as a back stop to further prevent unwanted bending of the trunk cable 40 in the event of accidental impact by a user or other object.

Further, the trunk cable 40 is secured to the first planar portion 142 adjacent to the point where the furcation plug 45 is coupled to the vertical furcation bracket 60 by universal clip 47. Thus, there are reduced torsion or twisting moments produced by the trunk cable 40 on the universal clip 47. Stated another way, if the trunk cable 40 was not supported by trunk cable manager 140, the weight of the trunk cable 40 would tend to pull it in a generally downward direction, causing the furcation plug 45 to rotate about axis 162 and/or axis 46. Rotation of the furcation plug 45 about axis 162 and/or axis 46, i.e., torsion on the furcation plug, would lead to stress on the universal clip and risk of breakage or reduced life span. Accordingly, supporting the trunk cable 40 at a point adjacent to that at which the universal clip 47 couples the furcation plug 45 to the vertical furcation bracket 60 reduces torsion on the universal clip 47 and thus reduces the risk of breakage.

Instead of the trunk cable manager 140, the trunk cable manager 200 may be used in a manner similar to that described above with respect to the trunk cable manager 140. In the case of the trunk cable manager 200, however, additional fastening members 160 may be used in connection with vertical slots 212 to support the trunk cables 40 as they extend substantially vertically along the side of the equipment cabinet 2.

It should be emphasized that the above-described embodiments of the present invention, particularly any "preferred" embodiments, are merely possible examples of implementations, merely set forth for a clear understanding of principles of the invention. Many variations and modifications may be made to the above-described embodiments of the invention without departing substantially from the spirit and principles of the invention, All such modifications and variations are intended to be included herein within the scope of this disclosure and the present invention and protected by the following claims.

What is claimed is:

1. An equipment cabinet arrangement comprising:
an equipment cabinet, including:
a rack including a plurality of vertical frame members,
a side panel,
a central rack space within the vertical frame members, and
a side panel space defined between one or more vertical frame members and the side panel;
a vertical cable manager, disposed in the side panel space, including:
a vertically-oriented first planar portion mounted against one of the vertical frame members,
an angled portion that angles away from the first planar portion,
a vertically-oriented second planar portion having first and second opposed sides, the first side being connected to the angled portion such that the first and second planar portions are not coplanar, and
a vertically-oriented trough connected to the second side of the second planar portion;
a cable having a first segment and a second segment, the first segment being routed vertically within the trough, the cable being supported by the first planar portion at a portion intermediate the first segment and the second segment, and the second segment of the cable being routed horizontally through the side panel space; and
a furcation bracket disposed in the side panel space, wherein the furcation bracket comprises either a row or a column of pairs of slots;
wherein the cable is routed horizontally from the vertical cable manager toward the furcation bracket;
wherein the cable includes a furcation plug adapted to attach to the furcation bracket;
wherein the furcation plug has locking members spaced from one another by a first length, furcation legs extending from the furcation plug, and connectors coupled to the furcation legs; and
wherein the slots in each of the pairs of slots in the furcation bracket are spaced from one another by a second length, wherein the second length is substantially equal to the first length for receiving the locking members of the furcation plug.

2. The equipment cabinet arrangement of claim 1, wherein the vertical cable manager is disposed adjacent a rear of the equipment cabinet.

3. The equipment cabinet arrangement of claim 1, wherein the furcation bracket is a vertical furcation bracket.

4. The equipment cabinet arrangement of claim 1, wherein the furcation bracket is a horizontal furcation bracket.

5. An equipment cabinet arrangement having a fiber management system, comprising:
an equipment cabinet, including:
a rack including a plurality of vertical frame members,
a side panel,
a central rack space within the vertical frame members, and
a side panel space defined between one or more vertical frame members and the side panel, the side panel space having opposing ends adjacent the front and rear of the equipment cabinet, respectively;
a fiber management system, disposed in the side panel space, including:
a vertical cable manager disposed in a first of the opposing ends of the side panel space,
a furcation bracket, and
an elongate accessory bracket, mounted to the rack in a second of the opposing ends of the side panel space and extending substantially the height of the rack, having a plurality of fiber management accessories mounted thereon; and
a cable having a first segment routed vertically in the vertical cable manager, a second segment supported by the furcation bracket, and a third segment supported by at least one of the fiber management accessories.

6. The equipment cabinet arrangement of claim 5, wherein the plurality of fiber management accessories include a termination panel comprising an opening for receiving sockets sized to receive connectors on furcation legs of a trunk cable, wherein the termination panel is sized to be disposed in the equipment cabinet outside the central rack space.

7. The equipment cabinet arrangement of claim 5, wherein the plurality of fiber management accessories include a fiber module bracket adapted to support a termination panel comprising an opening for receiving sockets.

8. The equipment cabinet arrangement of claim 5, wherein the plurality of fiber management accessories include a fiber retaining spool.

9. The equipment cabinet arrangement of claim 8, wherein the fiber retaining spool is a rotating spool.

10. The equipment cabinet arrangement of claim 8, wherein the fiber retaining spool includes a shaft and an arm extending from a distal end thereof.

11. The equipment cabinet arrangement of claim 5, wherein the elongate accessory bracket is a rail having a C-shaped cross-section and includes first and second parallel legs extending from a back plate.

12. The equipment cabinet arrangement of claim 11, wherein the first leg of the rail includes a column of evenly-spaced openings for mounting the fiber management accessories to the accessory bracket.

13. The equipment cabinet arrangement of claim 5, wherein the furcation bracket is a vertical furcation bracket, and wherein the fiber management system further includes a horizontal furcation bracket.

14. The equipment cabinet arrangement of claim 5, wherein the rack includes a front-side vertical member and a rear-side vertical member, wherein the elongate accessory bracket is coupled to the front-side vertical member, wherein the vertical cable manager is coupled to the rear-side vertical member, and wherein the furcation bracket is disposed between the vertical cable manager and the elongate accessory bracket.

* * * * *